(12) United States Patent
Lim et al.

(10) Patent No.: US 12,481,354 B2
(45) Date of Patent: Nov. 25, 2025

(54) METHOD FOR CONTROLLING MULTIPLE DISPLAYS AND ELECTRONIC DEVICE SUPPORTING SAME

(71) Applicant: Samsung Electronics Co., Ltd., Suwon-si (KR)

(72) Inventors: Gisoo Lim, Suwon-si (KR); Seungnyun Kim, Suwon-si (KR); Dongil Son, Suwon-si (KR); Jongmin Yoon, Suwon-si (KR); Seungjoo Lee, Suwon-si (KR); Kyusik Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/045,902

(22) Filed: Feb. 5, 2025

(65) Prior Publication Data

US 2025/0181150 A1    Jun. 5, 2025

Related U.S. Application Data

(63) Continuation of application No. PCT/KR2023/009853, filed on Jul. 11, 2023.

(30) Foreign Application Priority Data

Aug. 24, 2022   (KR) .................. 10-2022-0106388
Oct. 21, 2022   (KR) .................. 10-2022-0136721

(51) Int. Cl.
  *G06F 3/01*    (2006.01)
  *G06F 3/03*    (2006.01)
  *G06F 3/14*    (2006.01)
(52) U.S. Cl.
  CPC ............ *G06F 3/012* (2013.01); *G06F 3/0304* (2013.01); *G06F 3/1423* (2013.01)

(58) Field of Classification Search
  CPC .......... G06F 3/017; G06F 3/011; G06F 1/163; G06F 21/6245
  See application file for complete search history.

(56) References Cited

U.S. PATENT DOCUMENTS 11,210,832 B2    12/2021    Ballagas et al.
11,630,315 B2 *   4/2023    Border .................. G09G 5/026
                                                   356/445

(Continued)

FOREIGN PATENT DOCUMENTS

CN    106572417 A    4/2017
CN    114556187 A    5/2022

(Continued)

OTHER PUBLICATIONS

International Search Report for PCT/KR2023/009853 mailing date Oct. 5, 2023, 4 pages.

(Continued)

*Primary Examiner* — Van N Chow
(74) *Attorney, Agent, or Firm* — Nixon & Vanderhye, P.C.

(57) ABSTRACT

An electronic device according to an embodiment may comprise: a first display disposed on the first surface of the electronic device facing a user's face based on the electronic device being worn on the user's face; a second display disposed on the second surface of the electronic device opposite to the first surface; a sensor; and at least one processor, comprising processing circuitry, operatively connected to the first display, the second display, and the sensor. At least one processor, individually and/or collectively, may be configured to cause the electronic device to: identify, through the sensor, whether the electronic device is worn on the user's face; activate the second display based on identifying that the electronic device is not worn on the user's; and display a second screen related to a first screen through (Continued)

the first display based on identifying that the electronic device is worn on the user's face while the first screen is displayed through the activated second display.

18 Claims, 17 Drawing Sheets

(56) References Cited

U.S. PATENT DOCUMENTS

| | | | |
|---|---|---|---|
| 11,790,617 B2* | 10/2023 | Osterhout | G02B 27/0093 |
| | | | 345/633 |
| 11,822,736 B1* | 11/2023 | Shin | G06F 3/013 |
| 11,861,255 B1* | 1/2024 | Ive | G06F 3/147 |
| 2015/0015458 A1 | 1/2015 | Cho et al. | |
| 2015/0253573 A1 | 9/2015 | Sako et al. | |
| 2015/0278498 A1* | 10/2015 | Hong | G06F 21/32 |
| | | | 340/5.82 |
| 2017/0068500 A1 | 3/2017 | Rochford et al. | |
| 2018/0004478 A1 | 1/2018 | Chen | |
| 2018/0096533 A1 | 4/2018 | Osman | |
| 2018/0158246 A1 | 6/2018 | Grau | |
| 2018/0373371 A1 | 12/2018 | Kim | |
| 2019/0179147 A1 | 6/2019 | Ichimura et al. | |
| 2019/0286406 A1 | 9/2019 | Chen | |
| 2021/0042979 A1 | 2/2021 | Ballagas et al. | |
| 2021/0089150 A1 | 3/2021 | Wang et al. | |
| 2023/0221794 A1 | 7/2023 | Nakamichi et al. | |

FOREIGN PATENT DOCUMENTS

| | | |
|---|---|---|
| KR | 20150007129 A | 1/2015 |
| KR | 20150056521 A | 5/2015 |
| KR | 20190000427 A | 1/2019 |
| WO | 2017076785 A1 | 5/2017 |

OTHER PUBLICATIONS

Written Opinion of the ISA for PCT/KR2023/009853 mailing date Oct. 5, 2023, 6 pages.
Extended European Search Report dated Oct. 7, 2025 in EP Application No. 23857557.5.

* cited by examiner

METHOD FOR CONTROLLING MULTIPLE DISPLAYS AND ELECTRONIC DEVICE SUPPORTING SAME

CROSS-REFERENCE TO RELATED APPLICATIONS

This application is a continuation of International Application No. PCT/KR2023/009853 designating the United States, filed on Jul. 11, 2023, in the Korean Intellectual Property Receiving Office and claiming priority to Korean Patent Application Nos. 10-2022-0106388, filed on Aug. 24, 2022, and 10-2022-0136721, filed on Oct. 21, 2022, in the Korean Intellectual Property Office, the disclosures of each of which are incorporated by reference herein in their entireties.

BACKGROUND

Field

The disclosure relates to a method for controlling a plurality of displays and an electronic device supporting the same.

Description of Related Art

An increasing number of services and additional features are being offered through wearable electronic devices such as augmented reality glasses (AR glasses), video see through (VST) devices, and head mounted display (HMD) devices. To meet the needs of various users and raise use efficiency of electronic devices, communication service carriers or device manufacturers are jumping into competitions to develop electronic devices with differentiated and diversified functionalities. Accordingly, various functions that are provided through wearable electronic devices are evolving more and more.

A user may wear a wearable electronic device on his or her face and then execute functions of the wearable electronic device. For example, the user may wear the wearable electronic device on his or her face and view the screen displayed on the display while executing functions of the wearable electronic device using various input methods, such as a controller. However, executing functions of a wearable electronic device using various input methods, such as a controller, after wearing the device may cause inconvenience to the user who is not familiar with operating the wearable electronic device and various input methods, such as a controller.

SUMMARY

Embodiments of the disclosure provide a method for controlling a plurality of displays and an electronic device supporting the same, which may perform functions and provide information through the plurality of displays before and after wearing a wearable electronic device by the user.

A wearable device according to an example embodiment may comprise: a first display disposed to face in a first direction toward a user when the wearable device is worn on a face of the user, a second display to face in a second direction opposite to the first direction, a camera configured to capture images corresponding to a field of view of the user wearing the wearable device, a sensor, at least one processor comprising processing circuitry, and memory storing instructions. The instructions, when executed by the at least one processor individually or collectively, cause the wearable device to: identify, through the sensor, whether the wearable device is worn on the face; based on identifying that the wearable device is worn on the face, activate the first display; based on identifying that the wearable device is not worn on the face, deactivate the first display; while the wearable device is not worn on the face, control the second display to display a first screen and control the camera to capture images of the face of the user looking toward the first screen; while the first screen is displayed through the second display, identify that the wearable device is worn on the face; and based on identifying that the wearable device is worn on the face while displaying the first screen through the second display, control the first display to display a second screen related to the first screen.

A method for controlling a plurality of displays in a wearable device according to an example embodiment may comprise: identifying whether the wearable device is worn on a face of a user through a sensor of the wearable device including a first display, a second display, the sensor, and a camera configured to capture images corresponding to a field of view of the user wearing the wearable device, wherein the first display is disposed to face in a first direction toward the user when the wearable device is worn on the face of the user, and the second display is disposed to face in a second direction opposite to the first direction; based on identifying that the wearable device is worn on the face, activating the first display; based on identifying that the wearable device is not worn on the face, deactivating the first display; while the wearable device is not worn on the face, controlling the second display to display a first screen and controlling the camera to capture images of the face of the user looking toward the first screen; while the first screen is displayed through the second display, identifying that the wearable device is worn on the face; and based on identifying that the wearable device is worn on the face while displaying the first screen through the second display, controlling the first display to display a second screen related to the first screen.

In an example embodiment, in a non-transitory computer-readable medium storing computer-executable instructions, the computer-executable instructions may, when executed by at least one processor, comprising processing circuitry, of a wearable device, individually and/or collectively, cause the wearable device to: identify whether the wearable device is worn on a face of a user through a sensor of the wearable device including a first display, a second display, the sensor, and a camera configured to capture images corresponding to a field of view of the user wearing the wearable device, wherein the first display is disposed to face in a first direction toward the user when the wearable device is worn on the face of the user, and the second display is disposed to face in a second direction opposite to the first direction; based on identifying that the wearable device is worn on the face, activate the first display; based on identifying that the wearable device is not worn on the face, deactivate the first display; while the wearable device is not worn on the face, control the second display to display a first screen and control the camera to capture images of the face of the user looking toward the first screen; while the first screen is displayed through the second display, identify that the wearable device is worn on the face; and based on identifying that the wearable device is worn on the face while displaying the first screen through the second display, control the first display to display a second screen related to the first screen.

A method for controlling a plurality of displays and an electronic device supporting the same according to an example embodiment may perform functions and provide information through the displays even before being worn by the user.

A method for controlling a plurality of displays and an electronic device supporting the same according to an example embodiment may select content to be displayed through a display (first display described below) or make settings on the content based on a user input to a display (second display described below) before worn by the user and may thus reduce the time required to execute content to be displayed through the display (first display described below) and enhance immersion to the content to be displayed through the display (first display described below).

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
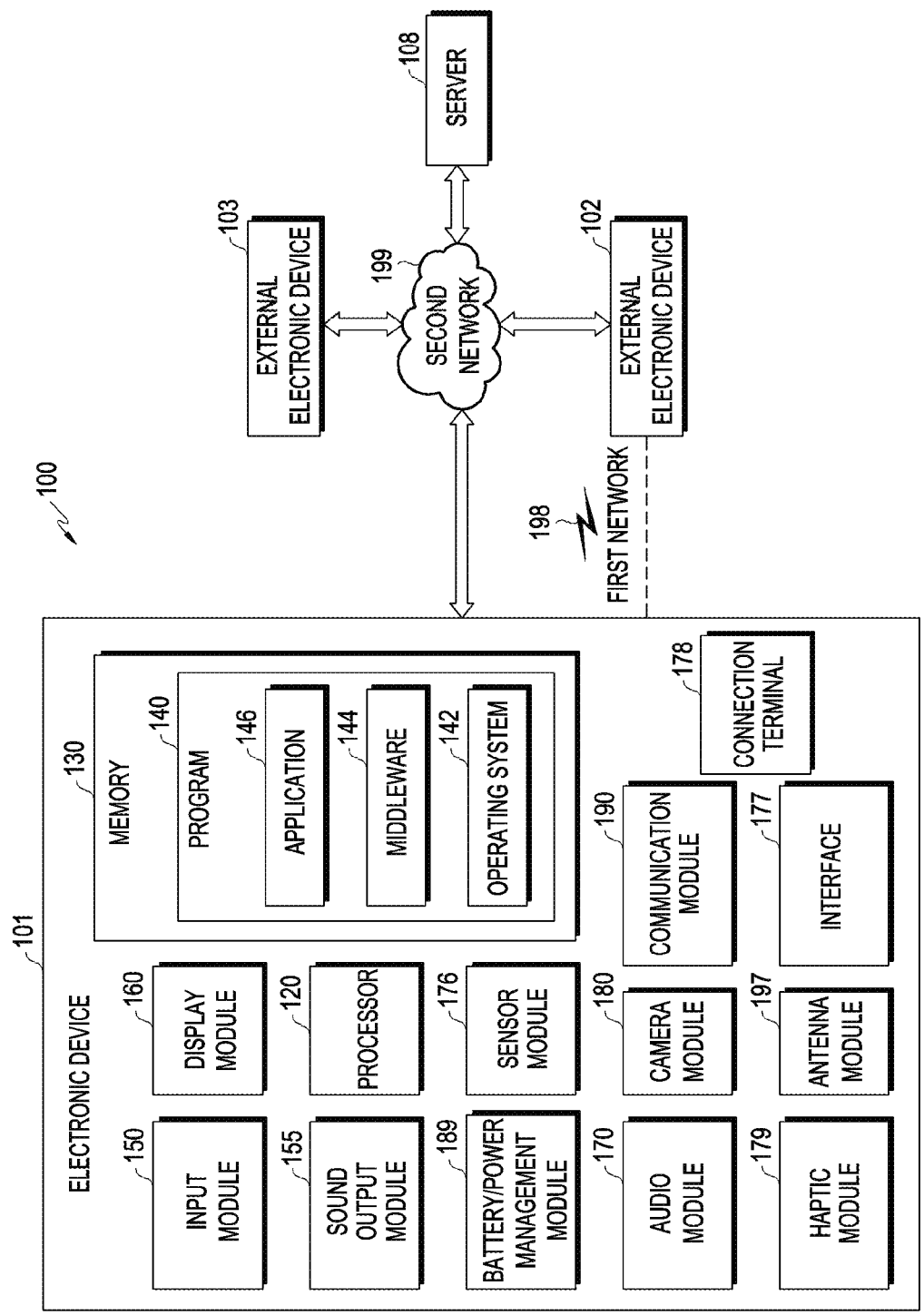
FIG. 1 is a block diagram illustrating an example electronic device according to various embodiments.

FIG. 1 is a block diagram 100 illustrating an example electronic device 101 according to an embodiment. The electronic device 101 may be, e.g., a wearable electronic device worn on the user's head, such as AR glasses, HMD device, and/or a VST device. The electronic device 101 may also be referred to as a wearable electronic device.

The external electronic devices 102 and 103 each may be a device of the same or a different type from the electronic device 101. According to an embodiment, all or some of operations to be executed at the electronic device 101 may be executed at one or more of the external electronic devices (external electronic devices 102 and 103 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. For example, the external electronic device 102 may render and transfer, to the electronic device 101, content data executed on an application, and the electronic device 101 receiving the data may output the content data to a display module. If the electronic device 101 detects the user's motion through, e.g., an inertial measurement unit (IMU) sensor, the processor 120 of the electronic device 101 may correct the rendering data received from the external electronic device 102 based on the motion information and output it to the display module 160. The electronic device 101 may transfer the motion information to the external electronic device 102 and request rendering so that screen data is updated accordingly. According to various embodiments, the external electronic device 102 may be various types of devices, such as a smart phone or a case device capable of storing and charging the electronic device 101.

According to an embodiment, the electronic device 101 may communicate with an external electronic device 102 via a first network 198 (e.g., a short-range wireless communication network), and/or an external electronic device 103 or a server 108 via a second network 199 (e.g., a long-range wireless communication network). According to an embodiment, the electronic device 101 may communicate with another electronic device via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module and/or a battery 189, a communication module 190, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

According to an embodiment, the processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or communication module 170 or a sensor module 190) onto a volatile memory, process the command or the data stored in the volatile memory, and store resulting data in a non-volatile memory. According to an embodiment, the processor 120 may include a main processor (e.g., a central processing unit (CPU) or an application processor (AP)), and/or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor. For example, when the electronic device 101 includes the main processor and the auxiliary processor, the auxiliary processor may be configured to use lower power than the main processor or to be specified for a designated function. The auxiliary processor may be implemented separately from, or as part of, the main processor. The auxiliary processor may control at least some of functions or states related to at least one component (e.g., display module 160, sensor module 176, or communication module 190) of the electronic device 101, instead of the main processor while the main processor is in an inactive (e.g., sleep) state or along with the main processor while the main processor is an active state (e.g., executing an application). According to an embodiment, the auxiliary processor (e.g., an image signal processor or a communication processor) may be implemented as part of another component (e.g., the camera module 180 or the communication module 190) functionally related to the auxiliary processor. According to an embodiment, the auxiliary processor (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

According to an embodiment, the memory 130 may store various data used by at least one component (e.g., the processor 120 or a sensor module 176) of the electronic device 101. The various data may include, for example, software (e.g., the program 140) and input data or output data for a command related thereto. The memory 130 may include a volatile memory or a non-volatile memory.

According to an embodiment, the program 140 may be stored in the memory 130 as software, and may include, for example, an operating system (OS) 142, middleware 144, or an application 146.

According to an embodiment, the input module 150 may receive a command or data to be used by other component (e.g., the processor 120) of the electronic device 101, from the outside (e.g., a user) of the electronic device 101. The input module 150 may include, but is not limited to, a microphone, a button, and/or a touch pad.

According to an embodiment, the sound output module 155 may output sound signals to the outside of the electronic device 101. The sound output module 155 may include, e.g., a speaker. The speaker may be used for general purposes, such as playing multimedia or playing record.

According to an embodiment, the display module 160 may visually provide information to the outside (e.g., the user) of the electronic device 101. For example, when the electronic device 101 is implemented as AR glasses, the display module 160 may include, but is not limited thereto, e.g., a liquid crystal display (LCD), a digital mirror device (DMD), a liquid crystal on silicon (LCoS), light emitting diode (LED) on silicon (LEDoS), organic light emitting diode (OLED), or micro light emitting diode (micro LED). The display module 160 may have different implementation forms depending on the type of electronic device 101.

According to an embodiment, the audio module 170 may convert a sound into an electrical signal and vice versa. According to an embodiment, the audio module 170 may obtain the sound via the input module 150, or output the sound via the sound output module 155 or a headphone of an external electronic device (e.g., external electronic device 102) directly (e.g., wiredly) or wirelessly coupled with the electronic device 101. The external electronic device 102 may be, e.g., a mobile device, such as a smart phone or tablet PC, but is not limited thereto.

According to an embodiment, the sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, and/or an illuminance sensor.

According to an embodiment, the interface 177 may support one or more specified protocols to be used for the electronic device 101 to be coupled with the external electronic device (e.g., external electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

According to an embodiment, the connecting terminal 178 may include a connector via which the electronic device 101 may be physically connected with the external electronic device (e.g., external electronic device 102). According to an embodiment, the connecting terminal 178 may include, for example, an HDMI connector, a USB connector, an SD card connector, or an audio connector (e.g., a headphone connector).

According to an embodiment, the haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

According to an embodiment, the camera module 180 may capture a still image and a video. According to an embodiment, the camera module 180 may include one or more lenses, image sensors, image signal processors, or flashes.

According to an embodiment, the power management module and/or battery 189 may manage power supplied to the first external electronic device 101. According to an embodiment, the power management module and/or battery 189 may be implemented as at least part of, for example, a power management integrated circuit (PMIC). The power management module and/or the battery 189 may supply power to at least one component of the electronic device 101. According to an embodiment, the power supply module and/or battery 189 may include, for example, a primary cell which is not rechargeable, a secondary cell which is rechargeable, or a fuel cell.

According to an embodiment, the communication module 190 may support establishing a direct (e.g., wired) communication channel or a wireless communication channel between the electronic device 101 and the external electronic device (e.g., external electronic device 102, external electronic device 103, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module (e.g., a cellular communication module, a short-range wireless communication module, or a global navigation satellite system (GNSS) communication module) or a wired communication module (e.g., a local area network (LAN) communication module or a power line communication (PLC) module). A corresponding one of these communication modules may communicate with the external electronic device 103 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module may identify or authenticate the electronic device 101 in a communication network, such as the first network 198 or the second network 199, using subscriber information (e.g., international mobile subscriber identity (IMSI)) stored in the subscriber identification module.

The wireless communication module may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module may support a high-frequency band (e.g., the mm Wave band) to achieve, e.g., a high data transmission rate. The wireless communication module may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module may support various requirements specified in the electronic device 101, an external electronic device (e.g., the external electronic device 103), or a network system (e.g., the second network 199). According to an embodiment, the wireless communication module may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. As described above, when the electronic device 101 supports cellular communication, such as 4G and 5G, the electronic device 101 may be referred to as a standalone (SA) type electronic device. Meanwhile, the electronic device 101 may be implemented not to support cellular communication, such as 4G and 5G. In this case, the electronic device 101 may use the Internet via the external electronic device 102 supporting cellular communication using the first network 198 in which case the electronic device 101 may be referred to as a non-standalone type electronic device.

According to an embodiment, the antenna module 197 may transmit or receive a signal or power to or from the outside (e.g., the external electronic device). According to an embodiment, the antenna module 197 may include an antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mm Wave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 103 via the server 108 coupled with the second network 199. The external electronic devices 102 and 103 each may be a device of the same or a different type from the electronic device 101. According to an embodiment, all or some of operations to be executed at the electronic device 101 may be executed at one or more of the external electronic devices (external electronic devices 102 and 103 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 103 may include an Internet-of-things (IoT) device. The server 108 may be an intelligent server using machine learning and/or a neural network. According to an embodiment, the external electronic device 103 or the server 108 may be included in the second network 199. The electronic device 101 may be applied to intelligent services (e.g., smart home, smart city, smart car, or healthcare) based on 5G communication technology or IoT-related technology.

Figure 2:
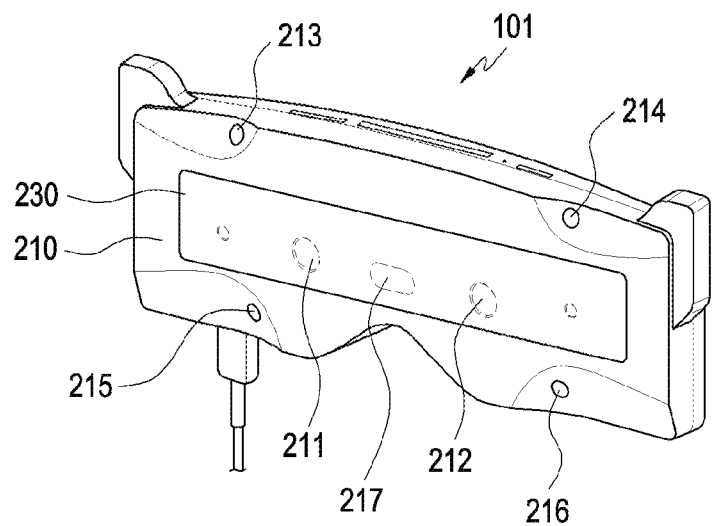
FIG. 2 is a front perspective view illustrating an electronic device according to various embodiments.

FIG. 2 is a front perspective view illustrating an electronic device 101 according to various embodiments.

Figure 3:
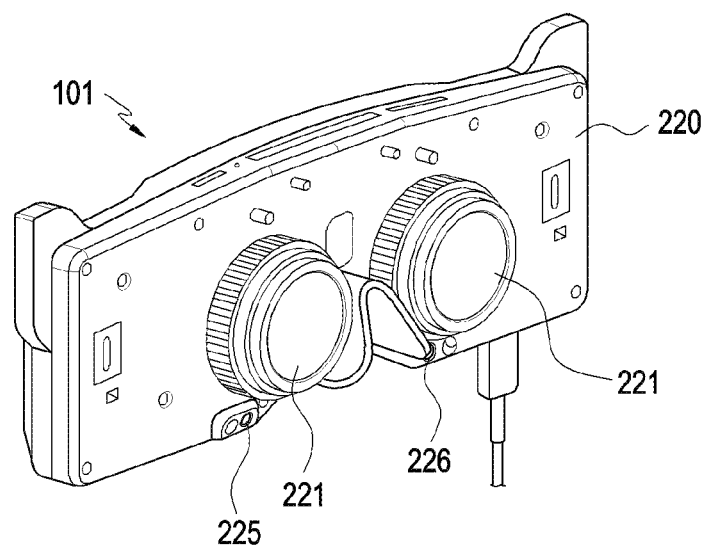
FIG. 3 is a rear perspective view illustrating an electronic device according to various embodiments.

FIG. 3 is a rear perspective view illustrating an electronic device 101 according to various embodiments.

Referring to FIGS. 2 and 3, in an embodiment, VST camera modules 211 and 212 for video see through (VST), a plurality of camera modules 213, 214, 215, and 216, a depth sensor 217, and/or a second display 230 may be disposed on the second surface 210 of the housing. For example, the VST camera modules 211 and 212, the plurality of camera modules 213, 214, 215, and 216, the depth sensor 217, and/or the second display 230 may be exposed through an opening formed in the second surface 210 of the housing. In an embodiment, the second surface 210 of the housing may be a surface opposite to the first surface 220 of the housing facing the face when the electronic device 101 is worn on the user's face.

In an embodiment, the VST camera modules 211 and 212 may obtain images related to the ambient environment of the electronic device. For example, the images obtained by the VST camera modules 211 and 212 may be provided, as at least a portion of VST content, to the user.

In an embodiment, the plurality of camera modules 213, 214, 215, and 216 may obtain images while the electronic device is worn by the user. The images obtained through the plurality of camera modules 213, 214, 215, and 216 may be used for simultaneous localization and mapping (SLAM), 6 degrees of freedom (6DoF), subject recognition, and/or tracking. In an embodiment, the depth sensor 217 may be used for identifying the distance to the object, such as time of flight (TOF). In an embodiment, alternatively or additionally to the depth sensor 217, the plurality of camera modules 213, 214, 215, and 216 may identify the distance to the object.

In an embodiment, the second display 230 (also referred to as an "external display") may be a display for providing a screen before (and after) the electronic device 101 is worn by the user (e.g., on the user's face). For example, in a state in which the electronic device 101 is not worn by the user after the electronic device 101 is powered on, the second display 230 may display a screen providing various information to the user. The screen providing various information by the second display 230 is described below in detail.

In an embodiment, the second display 230 may include a touch sensor (or touch panel) for receiving a user input. For example, the second display 230 may include a touch sensor for receiving a user input to execute a function of the electronic device while a screen is displayed through the second display 230 before (and after) the electronic device 101 is worn by the user.

In an embodiment, the size of the second display 230 may be implemented to differ according to embodiments. For example, the size of the second display 230 may be implemented to have a size in which the second display 230 does not overlap the VST camera modules 211 and 212 and the depth sensor 217. For example, the size of the second display 230 may be implemented to have a size in which the second display covers the VST camera modules 211 and 212 and the depth sensor 217 as shown in FIG. 2. For example, the size of the second display 230 may be implemented to be substantially the same as the size of the second surface 210 of the housing.

In an embodiment, when the size of the second display 230 is implemented to be substantially the same as the size of one surface of the housing or to cover the VST camera modules 211 and 212, the VST camera modules 211 and 213 may be under display cameras (UDCs) disposed under the second display.

In an embodiment, the second display 230 may be implemented in various forms. For example, the second display 230 may be implemented in the for of a U cut or notch not to overlap the VST camera modules 211 and 212 and the depth sensor 217.

According to an embodiment, camera modules 225 and 226 for face recognition and/or the first display 221 (and/or lens) may be disposed on the first surface 220 of the housing.

In an embodiment, the camera modules 225 and 226 for face recognition may be used for recognizing the user's face.

In an embodiment, the first display 221 (also referred to as an "internal display") (and/or lens) may be disposed on the first surface 220 of the electronic device 101 facing the face when the electronic device 101 is worn on the user's face. In an embodiment, the first display 221 (and/or lens) may display a screen including various information while the electronic device 101 is worn by the user.

In an embodiment, although not shown in FIGS. 2 and 3, the electronic device 101 may further include one or more components. For example, the electronic device 101 may further include a proximity sensor, a touch sensor, and/or a pressure sensor for detecting that the electronic device is worn on the user (e.g., the user's face). For example, the electronic device 101 may further include a fingerprint sensor (an optical or ultrasonic fingerprint sensor). For example, the electronic device 101 may further include at least one key (or button). For example, the processor 120 may selectively activate the first display 221 or the second display 230 based on an input to at least one key. For example, the processor 120 may selectively activate the first display 221 or the second display 230 based on the type of an input to at least one key. For example, the processor 120 may activate the first display 221 when obtaining a first type of input (e.g., a short press) to the key. For example, the processor 120 may activate the second display 230 when obtaining a second type of input (e.g., a long press) to the key.

In an embodiment, the electronic device 101 may not include some of the components shown in FIGS. 2 and 3. For example, the electronic device 101 may not include the camera modules 215 and 216 among the plurality of camera modules 213, 214, 215 and 216.

In an embodiment, the electronic device 101 may further include at least one of the components of the electronic device 101 shown in FIG. 1.

A wearable device according to an example embodiment may comprise: a first display disposed to face in a first direction toward a user when the wearable device is worn on a face of the user, a second display to face in a second direction opposite to the first direction, a camera configured to capture images corresponding to a field of view of the user wearing the wearable device, a sensor, at least one processor comprising processing circuitry, and memory storing instructions. The instructions, when executed by the at least one processor individually or collectively, cause the wearable device to: identify, through the sensor, whether the wearable device is worn on the face; based on identifying that the wearable device is worn on the face, activate the first display; based on identifying that the wearable device is not worn on the face, deactivate the first display; while the wearable device is not worn on the face, control the second display to display a first screen and control the camera to capture images of the face of the user looking toward the first screen; while the first screen is displayed through the second display, identify that the wearable device is worn on the face; and based on identifying that the wearable device is worn on the face while displaying the first screen through the second display, control the first display to display a second screen related to the first screen.

In an example embodiment, wherein the instructions, when executed by the at least one processor individually or collectively, cause the wearable device to: obtain a user input related to the first screen displayed through the second display; and based on the user input, perform an operation of displaying the second screen.

In an example embodiment, wherein the instructions, when executed by the at least one processor individually or collectively, cause the wearable device to: perform an operation of displaying the second screen such that the second screen has continuity to the first screen.

In an example embodiment, wherein the instructions, when executed by the at least one processor individually or collectively, cause the wearable device to: perform an operation of displaying the second screen such that content provided in the second screen is displayed in a virtual space.

In an example embodiment, wherein the instructions, when executed by the at least one processor individually or collectively, further cause the wearable device to: obtain, using the camera, an image for the user in a state in which the wearable device is not worn on the face; and transmit, to an external electronic device, the image.

In an example embodiment, wherein the instructions, when executed by the at least one processor individually or collectively, further cause the wearable device to: based on the wearable device being changed from a sleep state to a standby state, or based on the wearable device being turned on, activate the second display.

In an example embodiment, wherein the instructions, when executed by the at least one processor individually or collectively, further cause the wearable device to: while displaying the second screen through the first display, display, through the second display, information related to content provided in the second screen.

In an example embodiment, wherein the instructions, when executed by the at least one processor individually or collectively, further cause the wearable device to: while a screen is provided through the first display in a state in which the wearable device is worn on the face, obtain information about an environment of the wearable device, wherein the information about the environment of the wearable device includes whether a person is positioned around the wearable device; and based on the information about the environment, differently display information related to the screen through the second display.

In an example embodiment, wherein the instructions, when executed by the at least one processor individually or collectively, further cause the wearable device to: obtain a state of the user, while a screen is provided through the first display in a state in which the wearable device is worn on the face; and based on the state of the user, display information about whether the user is in a state of being capable of conversation through the second display.

In an example embodiment, wherein the instructions, when executed by the at least one processor individually or collectively, further cause the wearable device to: while a screen is provided through the first display in a state in which the wearable device is worn on the face, display, through the second display, an image for an eye of the user.

Figure 4:
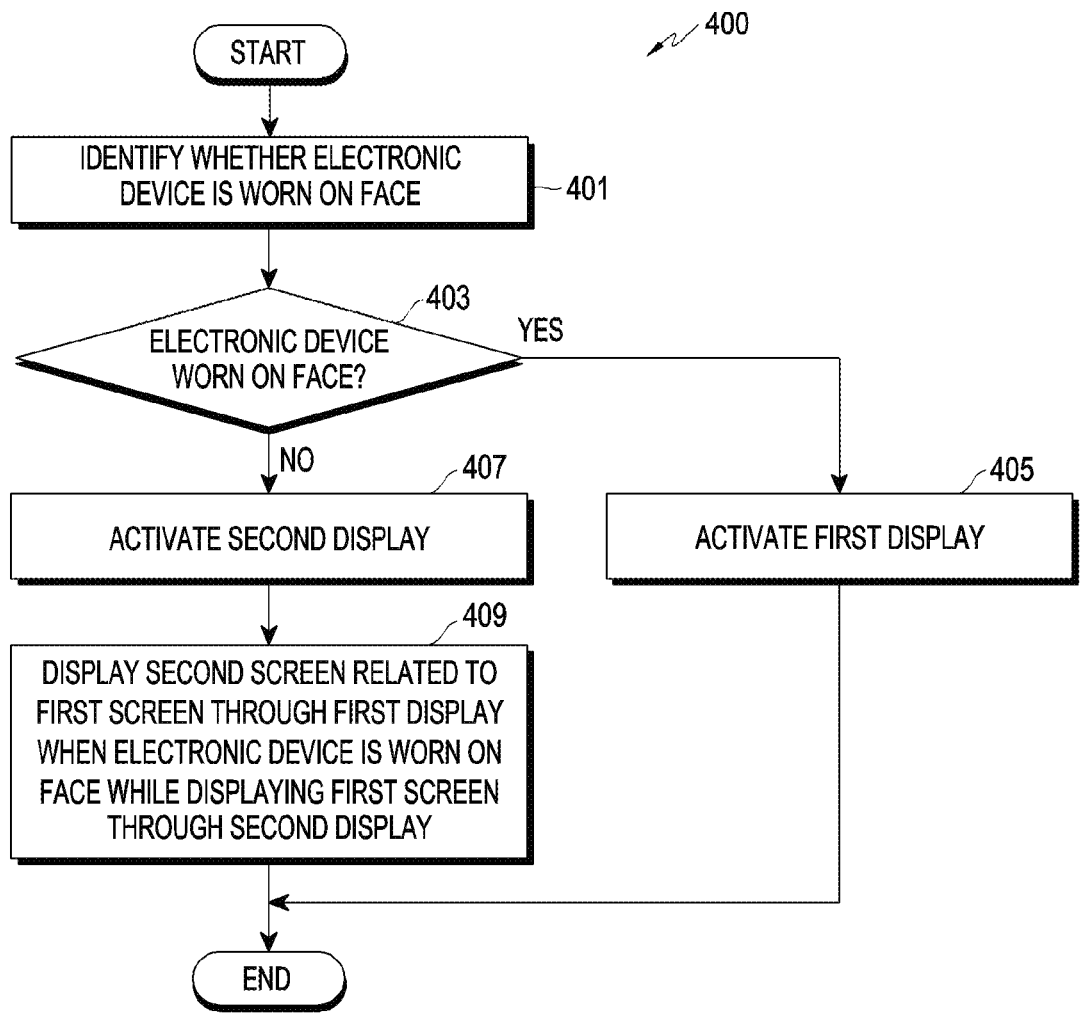
FIG. 4 is a flowchart illustrating an example method for controlling a plurality of displays according to various embodiments.

FIG. 4 is a flowchart 400 illustrating an example method for controlling a plurality of displays according to various embodiments.

Referring to FIG. 4, in operation 401, in an embodiment, the processor 120 may identify whether the electronic device 101 is worn on the user's face.

In an embodiment, when the electronic device 101 is powered on, the processor 120 may identify whether the electronic device 101 is worn on the user's face through a sensor (e.g., a proximity sensor). For example, based on the electronic device 101 being powered on based on a user input, the processor 120 may periodically identify whether the electronic device 101 is worn on the user's face through the proximity sensor. In the above-described example, the proximity sensor is illustrated as the sensor for identifying whether the electronic device 101 is worn on the user's face, but is not limited thereto. For example, the processor 120 may identify whether the electronic device 101 is worn on the user's face using a touch sensor or a pressure sensor disposed on a temple unit (or a leg portion) of the electronic device 101.

When it is identified that the electronic device 101 is worn on the user's face in operation 403, in an embodiment, the processor 120 may activate the first display 221 in operation 405. For example, when it is identified that the electronic device 101 is worn on the user's face, the processor 120 may turn on the first display 221. The processor 120 may display, through the first display 221, a screen (or a 3D home screen) including information (e.g., an application icon) indicating functions of the electronic device 101 executable by a user input. The processor 120 may execute the function of the electronic device 101 using the screen displayed through the first display 221.

When it is identified that the electronic device 101 is not worn on the user's face in operation 403, in an embodiment, the processor 120 may activate the second display 230 in operation 407.

In an embodiment, when it is identified that the electronic device 101 is not worn on the user's face, the processor 120 may turn on the second display 230. The processor 120 may display a screen set to be displayed as a default when the second display 230 is turned on, through the second display 230. For example, the processor 120 may display a lock screen through the second display 230. For example, the processor 120 may display a home screen including a plurality of application icons through the second display 230. However, the screen set to be displayed as a default when the second display 230 is turned on is not limited to the lock screen and the home screen. In the above-described example, when it is identified that the electronic device 101 is not worn on the user's face, the second display 230 is turned on, but the disclosure is not limited thereto. For example, when the electronic device 101 is powered on (or when the electronic device 101 is booted), the processor 120 may turn on the second display 230 without performing the operation of identifying whether the electronic device 101 is worn by the user.

In an embodiment, when the electronic device 101 is switched from the sleep state to the standby state, the processor 120 may activate the second display 230. In an embodiment, when the second display 230 is activated, the processor 120 may display a first screen through the second display 230.

In an embodiment, when it is identified that the electronic device 101 is not worn on the user's face, the processor 120 may activate, together with the second display 230, a touch sensor (e.g., a touch sensor disposed under the second display 230 or inside the second display 230) of the second display 230 so that the electronic device 101 performs a function based on a touch input to the second display 230.

When the touch sensor of the second display 230 is activated, the processor 120 may perform a function of the electronic device 101 corresponding to the user input, based on the user input to the second display 230.

In operation 409, in an embodiment, based on identifying that the electronic device 101 is worn on the user's face while displaying the first screen through the activated second display 230, the processor 120 may display a second screen related to the first screen through the first display 221.

In an embodiment, the processor 120 may identify whether the electronic device 101 is worn by the user while displaying the screen through the second display 230. For example, while displaying the screen through the second display 230, it may be periodically identified whether the electronic device 101 is worn by the user.

In an embodiment, when it is identified that the electronic device 101 is worn by the user, the processor 120 may display, through the first display 221, the second screen (hereinafter, referred to as a "second screen") related to a screen (hereinafter, referred to as a "first screen") displayed through the second display 230 before wearing the electronic device 101.

In an embodiment, the second screen displayed through the first display 221 may include a screen having continuity to the first screen displayed through the second display 230 before the electronic device 101 is worn by the user. In an embodiment, the second screen may be a screen displayed through the first display 221 by executing a function corresponding to the user input to the first screen after the electronic device 101 is worn by the user when the user input related to the first screen (e.g., the first screen displayed through the second display 230) is input before the electronic device 101 is worn by the user. For example, when a user input for selecting one icon from among one or more icons is input on the first screen including the one or more icons displayed through the second display 230 before the electronic device 101 is worn by the user, the second screen related to the function or application corresponding to the selected icon may not be executed through the second display 230. For example, the second screen may be a second screen displayed through the first display 221 after the electronic device 101 is worn by the user and including an execution screen of the selected icon.

In an embodiment, the processor 120 may deactivate the activated second display 230 based on identifying that the electronic device 101 is worn on the user's face. For example, based on identifying that the electronic device 101 is worn on the user's face, the processor 120 may deactivate the activated second display 230. In the above-described example, the operation of turning off the second display 230 is described as an example of the operation of deactivating the second display 230, but the disclosure is not limited thereto. Hereinafter, deactivating the second display 230 may include not only turning off the second display 230, but also turning the second display 230 into a standby state, a sleep state, or an idle state.

In an embodiment, the processor 120 may deactivate the second display 230 and/or the touch sensor of the second display 230, based on identifying that the electronic device 101 is worn on the user's face.

In an embodiment, the processor 120 may maintain the active state of the second display 230 even when the electronic device 101 is worn on the user's face. For example, while various functions are provided through the first display 221 in a state in which the electronic device 101 is worn on the face, the processor 120 may maintain the active state of the second display 230 in order to display state information about the electronic device 101, information related to the user (e.g., information about the state of the user), or information related to content provided through the first display 221 through the second display 230.

In an embodiment, when the electronic device 101 is worn on the user's face, the processor 120 may maintain the active state of the touch sensor of the second display 230 so that the function of the electronic device 101 is performed by a user input to the second display 230. For example, when the electronic device 101 is worn on the user's face, the processor 120 may deactivate the second display 230 and may maintain the active state of the touch sensor disposed under the second display 230 or inside the second display 230.

Hereinafter, a method for controlling a plurality of displays is described in greater detail with reference to FIGS. 5 to 20.

Figure 5:
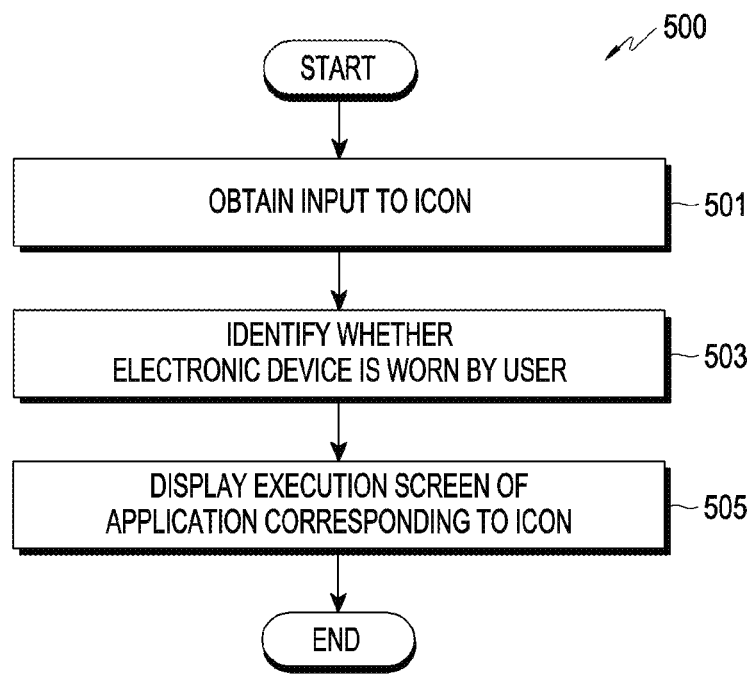
FIG. 5 is a flowchart illustrating an example method for displaying a screen through a first display based on an input to a second display according to various embodiments.

FIG. 5 is a flowchart 500 illustrating an example method for displaying a screen through a first display 221 based on an input to a second display 230 according to various embodiments.

Figure 6:
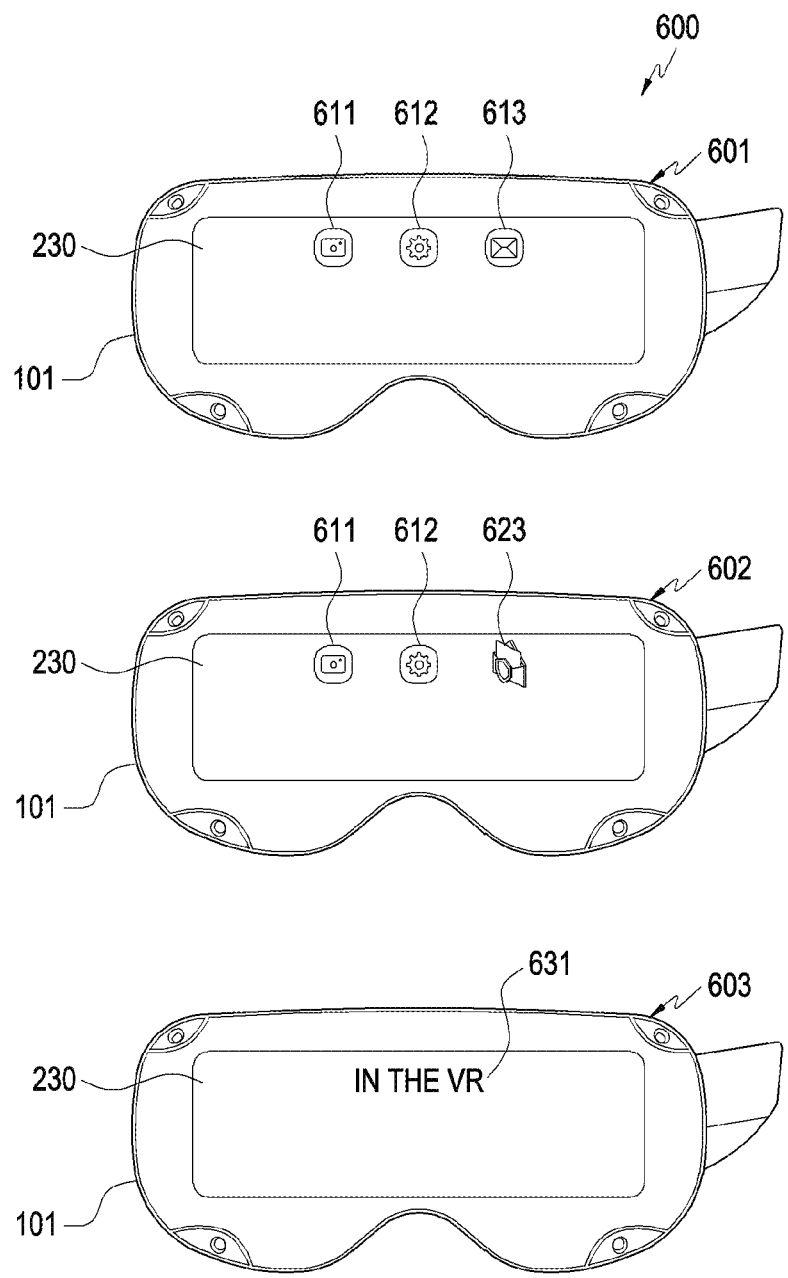
FIG. 6 is diagram illustrating an example method for displaying a screen through a first display based on an input to a second display according to various embodiments.

FIG. 6 is diagram 600 illustrating an example method for displaying a screen through a first display 221 based on an input to a second display 230 according to various embodiments.

Figure 7:
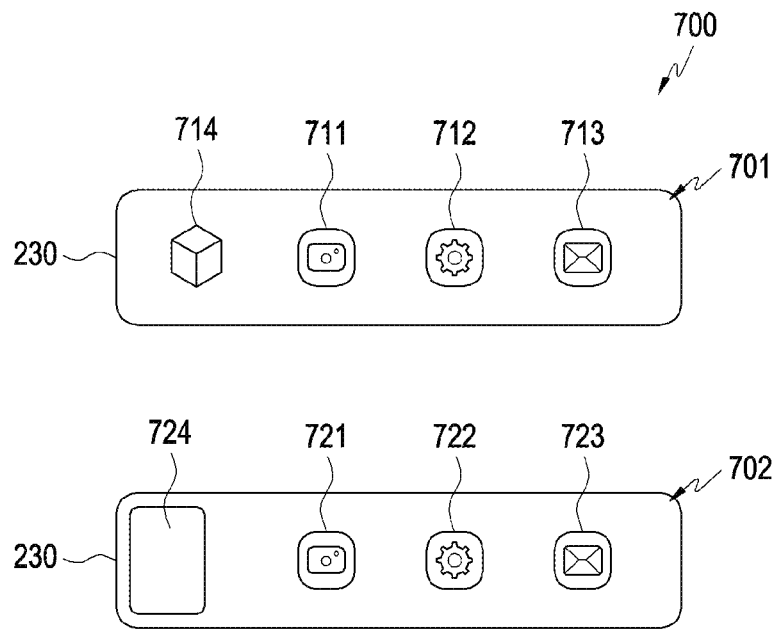
FIG. 7 is an diagram illustrating an example method for displaying a screen through a first display based on an input to a second display according to various embodiments.

FIG. 7 is a diagram 700 illustrating an example method for displaying a screen through a first display 221 based on an input to a second display 230 according to various embodiments.

The embodiment illustrated in FIG. 5 is an example embodiment, and the operation order according to various embodiments of the disclosure may be different from that illustrated in FIG. 6, and some of the operations illustrated in FIG. 6 may be omitted, the order between the operations may be changed, or the operations may be merged. In an embodiment, the operations of FIG. 5 may be operations after operation 407 of FIG. 4, or may be included in operation 409.

Referring to FIGS. 5, 6 and 7 (which may be referred to as FIGS. 5 to 7), in operation 501, in an embodiment, the processor 120 may obtain an input to an icon displayed through the second display 230.

In an embodiment, the processor 120 may display a first screen including one or more icons (e.g., one or more application icons) through the activated second display 230. For example, when the second display 230 is activated, the processor 120 may display a first screen including one or more icons through the activated second display 230. For example, as illustrated in reference numeral 601 of FIG. 6, the processor 120 may display a first screen including icons 611, 612, and 613 through the second display 230.

In an embodiment, the processor 120 may obtain a user input for selecting one icon from among one or more icons displayed through the second display 230. For example, in reference numeral 601, the processor 120 may obtain a user input for selecting a text message icon 613 from among the icons 611, 612, and 613.

In operation 503, in an embodiment, after the input to the icon is obtained, the processor 120 may identify whether the electronic device 101 is worn by the user for a designated time.

In an embodiment, even when an input to the icon displayed through the second display 230 is obtained in operation 501, the processor 120 may not display the second screen, which is the execution screen of the application corresponding to the icon, on the first display 221 before the electronic device 101 is worn by the user.

In an embodiment, the processor 120 may identify whether the electronic device 101 is worn by the user for a designated time (e.g., within a designated time) from the time when the user input for selecting the icon displayed through the second display 230 is obtained.

In an embodiment, the processor 120 may change the display of the selected icon after the user input for selecting the icon displayed through the second display 230 is obtained. For example, as illustrated in reference numeral 602 of FIG. 6, the processor 120 may change a text message icon 613 selected by a user input to a 3D text message icon 623. For example, after the user input for selecting an icon displayed through the second display 230 is obtained, the processor 120 may apply an animation effect to the icon selected by the user input. For example, after the user input for selecting the icon displayed through the second display 230 is obtained, the processor 120 may change the shade (or color) of the icon selected by the user input. For example, after the user input for selecting an icon displayed through the second display 230 is obtained, the processor 120 may display a loading icon in place of the icon selected by the user input. However, the operation of changing the display of the selected icon after the user input for selecting the icon displayed through the second display 230 is obtained is not limited to the above-described examples. Further, in the above-described example, a user input to an icon displayed through the second display 230 is illustrated, but the disclosure is not limited thereto. For example, when a user input for selecting an image is obtained through the second display 230, the processor 120 may display a preview screen of the image through the second display 230 instead of or in addition to the selected image.

In an embodiment, after a user input for selecting the icon displayed through the second display 230 is obtained, the processor 120 may maintain the changed display of the selected icon for the designated time (or until the electronic device 101 is worn by the user).

In an embodiment, when an input to the icon is obtained, and when the electronic device 101 is worn by the user, the processor 120 may output, through the second display 230, information indicating that the execution screen of the application corresponding to the icon may be displayed through the first display 221.

In an embodiment, if the electronic device 101 is not worn by the user for a designated time after a user input for selecting the icon displayed through the second display 230 is obtained, the processor 120 may not perform the function (e.g., execution of the application corresponding to the selected application icon) corresponding to the user input for selecting the icon. For example, if the electronic device 101 is not worn by the user for a designated time after the user input for selecting the icon is obtained, the processor 120 may cancel (or disregard or discard) the user input for selecting the icon.

In an embodiment, when the electronic device 101 is not worn by the user for the designated time after the user input for selecting the icon displayed through the second display 230 is obtained, the processor 120 may display the second screen, which is the execution screen of the selected icon, through the second display 230.

In an embodiment, if the electronic device 101 is not worn by the user for the designated time after the user input for selecting the icon displayed through the second display 230 is obtained, the processor 120 may change (or restore) the changed display of the selected icon back to the display before obtaining the user input. For example, after the user input for selecting the displayed icon is obtained through the second display 230, the processor 120 may display a 3D text message icon 623 through the second display 230 for a designated time. After the designated time elapses, the processor 120 may display the text message icon 613 displayed before the user input in place of the 3D text message icon 623 through the second display 230.

In operation 505, in an embodiment, when the electronic device 101 is worn by the user, the processor 120 may display the execution screen of the application corresponding to the icon (e.g., the execution screen of the application corresponding to the icon as the second screen) through the first display 221. For example, when the electronic device 101 is worn by the user within the designated time after the user input for selecting the icon is obtained, the processor 120 may display the execution screen of the application corresponding to the icon through the first display 221. For example, in FIG. 6, when the electronic device 101 is worn by the user within the designated time after the user input for selecting the text message icon 613 is obtained, the processor 120 may display the execution screen of the text message application corresponding to the text message icon 613 through the first display 221. In an embodiment, as shown by reference numeral 603 of FIG. 6, while displaying the execution screen of the application corresponding to the icon through the first display 221, the processor 120 may display information 631 indicating that the screen is being provided through the first display 221 through the second display 230. However, the disclosure is not limited thereto, and for example, the processor 120 may deactivate the second display 230 or display information related to the content provided through the first display 221 through the second display 230 while displaying the execution screen of the application corresponding to the icon through the first display 221. For example, while displaying the execution screen of the application corresponding to the icon through the first display 221, the processor 120 may display at least a portion of the execution screen of the application displayed through the first display 221 through the second display 230.

In an embodiment, based on an input for selecting the first display 221 or the second display 230 (e.g., an input for selecting the display to display the execution screen of the application corresponding to the icon selected by the user input from among the first display 221 or the second display 230), the processor 120 may display the execution screen of the application corresponding to the selected icon through the first display 221 or the second display 230.

For example, in reference numeral 701, the processor 120 may display an icon 714 for selecting a display together with the application icons 711, 712, and 713 through the second display 230. When a user input for selecting the application icon 713 is obtained after the user input for selecting the icon 714 is obtained, the processor 120 may display the second screen, which is the execution screen of the application corresponding to the application icon 713, through the first display 221 after the electronic device 101 is worn by the user. When a user input for selecting the application icon 713 is obtained without a user input to the icon 714, the processor 120 may display the execution screen of the application corresponding to the application icon 713 through the second display 230. Reference numeral 701 illustrates only one icon 714 for selecting a display, but is not limited thereto. For example, the processor 120 may display an icon for selecting the first display 221 and an icon for selecting the second display 230 together with the application icons 711, 712, and 713 through the second display 230. For example, when the user input for selecting the icon for selecting the first display 221 is obtained and then the user input for selecting the application icon 713 is obtained, the processor 120 may display the execution screen of the application corresponding to the application icon 713 through the first display 221 after the electronic device 101 is worn by the user. For example, when the user input for selecting the icon for selecting the second display 230 is obtained and then the user input for selecting the application icon 713 is obtained, the processor 120 may display the execution screen of the application corresponding to the application icon 713 through the second display 230.

For example, in reference numeral 702, the processor 120 may display an area 724 for selecting a display together with the application icons 721, 722, and 723 through the second display 230. Based on an input of moving the icon 723 to the area 724 (e.g., an input of dragging the icon 723 to the area 724), the processor 120 may display the second screen, which is the execution screen of the application corresponding to the application icon 723, through the first display 221 after the electronic device 101 is worn by the user. The processor 120 may display the execution screen of the application corresponding to the application icon 723 through the second display 230 based on an input (e.g., a touch down input) of touching the icon 723 without the input of moving the icon 723 to the area 724.

In an embodiment, the processor 120 may display the execution screen of the application corresponding to the icon selected based on the user input through the first display 221 or the second display 230, based on the type of the touch input to the icon. For example, when a first type of input (e.g., a short press) to the icon is obtained, the processor 120 may display the execution screen of the application corresponding to the icon through the second display 230. For example, when a second type of input (e.g., a long press) to the icon is obtained, the processor 120 may display the execution screen of the application corresponding to the icon through the first display 221 after the electronic device 101 is worn by the user.

In an embodiment, the processor 120 may display the execution screen of the application corresponding to the icon selected based on the user input through the first display 221 or the second display 230, based on the number of touch inputs to the icon. For example, when the touch input to the icon is input once, the processor 120 may display the execution screen of the application corresponding to the icon through the second display 230. For example, when the touch input to the icon is input twice, the processor 120 may display the execution screen of the application corresponding to the icon through the first display 221 after the electronic device 101 is worn by the user.

However, the input for selecting the first display 221 or the second display 230 is not limited to the above-described examples. For example, the processor 120 may select the display on which the application corresponding to the icon selected by a user input is to be executed, based on an input to a key (or a button) of the electronic device 101.

Figure 8A:
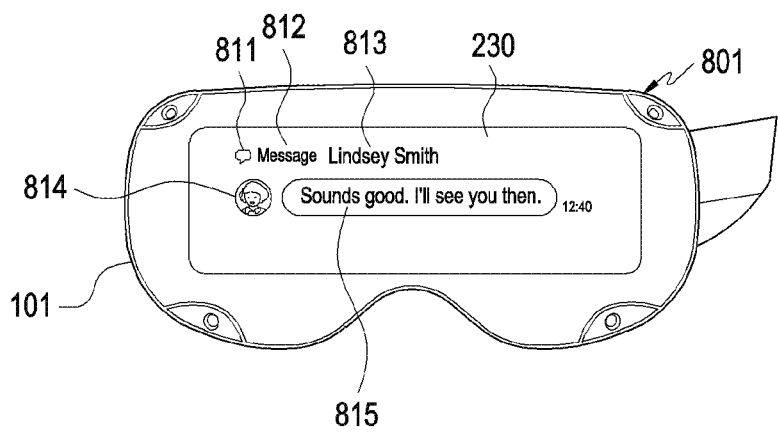
FIGS. 8A and 8B are diagrams illustrating an example method for providing information through a first display and a second display according to various embodiments.
Figure 8B:
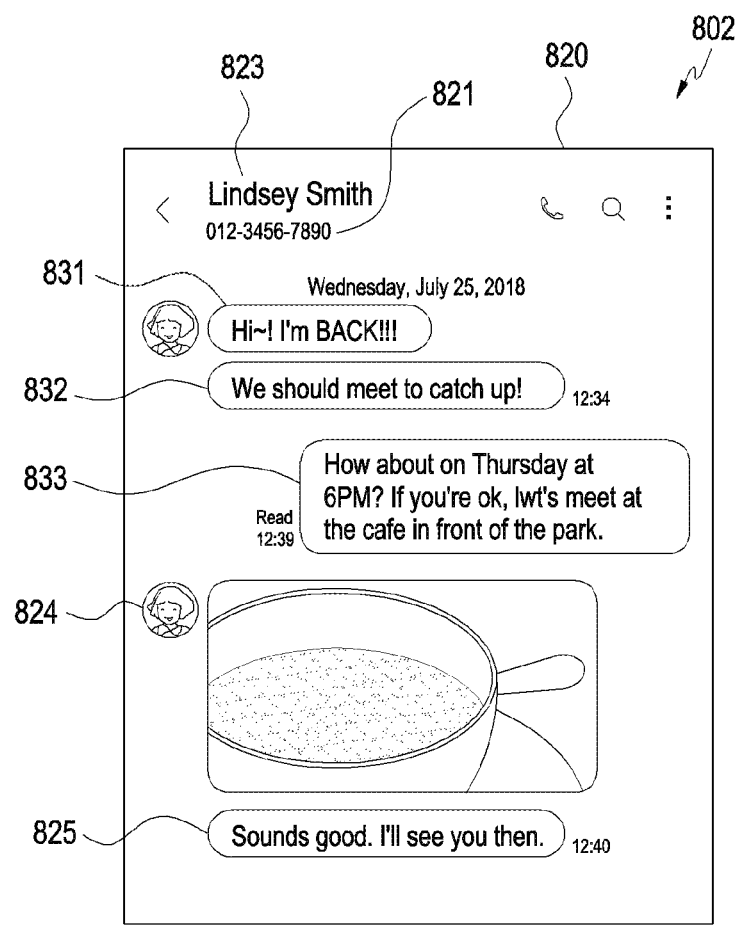

FIGS. 8A and 8B are diagrams 801 and 802 illustrating an example method for providing information through a first display 221 and a second display 230 according to various embodiments.

Referring to FIGS. 8A and 8B, in an embodiment, the processor 120 may receive a notification from an external electronic device (e.g., the external electronic device 102, the external electronic device 103, or the server 108) through the communication module 190 while providing a screen through the second display 230 or while the second display 230 is inactive. For example, the processor 120 may receive a notification related to a text message from the external electronic device (e.g., the external electronic device 102, the external electronic device 103, or the server 108) through the communication module 190. When the notification is received, the processor 120 may display, e.g., an icon indicating the received notification in an indicator area of the second display 230.

In an embodiment, the processor 120 may display at least a portion of the information related to the notification through the second display 230, based on an input for displaying the notification (e.g., the content of the notification) (e.g., a user input to the icon indicating the notification or an input for identifying the content of the notification). For example, as shown by reference numeral 801 of FIG. 8, when a text message is received from the external electronic device (e.g., the external electronic device 102, the external electronic device 103, or the server 108) through the second display 230, the processor 120 may display an icon 811 indicating the text message application, information 812 indicating the name of the text message application, the name 813 of the sender of the text message, an image 814 of the sender of the text message, or at least a portion 815 of the content of the currently received text message.

In an embodiment, when the electronic device 101 is worn by the user while displaying at least a portion of the information related to the notification through the second display 230, the processor 120 may display more detailed information related to the notification through the first display 221. For example, when the electronic device 101 is worn by the user while displaying at least a portion of the information related to the notification shown in reference numeral 801 through the second display 230, as shown in reference numeral 802 of FIG. 8B, the processor 120 may display, through the first display 221, a screen 820 including the name 823 of the sender of the text message, the phone number 821 of the sender of the text message, the image 824 of the sender of the text message, messages 831 and 832 previously sent by the sender of the text message, message 833 transmitted by the user to the sender of the text message, and/or at least a portion of 825 of the content of the currently received text message.

Although FIGS. 8A and 8B illustrate that the notification is received from the external electronic device (e.g., the external electronic device 102, the external electronic device 103, or the server 108), the disclosure is not limited thereto. For example, the processor 120 may apply the examples applied to the AR device notification received from the external electronic device (e.g., the external electronic device 102, the external electronic device 103, or the server 108) to the notification generated in the electronic device 101 in the same or similar manner.

In FIGS. 8A and 8B, a notification is illustrated as information provided through the first display 221 and the second display 230, but the disclosure is not limited thereto. For example, the processor 120 may apply the examples applied to the above-described notification to a screen including a web page and/or a document in the same or similar manner. For example, when the electronic device 101 is worn by the user while displaying a portion of the web page through the second display 230, the processor 120 may display the entire web page (or a portion of the web page including a portion of the web page displayed through the second display 230) in a virtual space (or in a 3D form) through the first display 221.

FIGS. 8A and 8B illustrate an example operation of providing information related to notification through the first display 221 and the second display 230, but the disclosure is not limited thereto.

In an embodiment, a call may be received from the electronic device 101 while the electronic device 101 is not worn by the user (e.g., a call event may occur). The processor 120 may display a notification related to the call (e.g., a notification indicating that the call is being received) through the second display 230. When the electronic device 101 is worn by the user, the processor 120 may connect the call so that the user may talk to the counterpart party.

In an embodiment, an event related to a set scale or notification in the electronic device 101 may occur while the electronic device 101 is not worn by the user. The processor 120 may display information related to the occurring event through the second display 230 and/or output an audio indicating that the event occurs through the speaker. When the electronic device 101 is worn by the user, the processor 120 may display details of the event (e.g., details of a schedule or notification) through the first display 221.

In an embodiment, the processor 120 may receive a file (e.g., an image file or a music file) from the external electronic device through the communication module 190 while the electronic device 101 is not worn by the user. The processor 120 may display, through the second display 230, information indicating that the file is being received or information indicating that reception is completed. When the electronic device 101 is worn by the user, the processor 120 may play the file through the first display 221 and/or the speaker.

Figure 9:
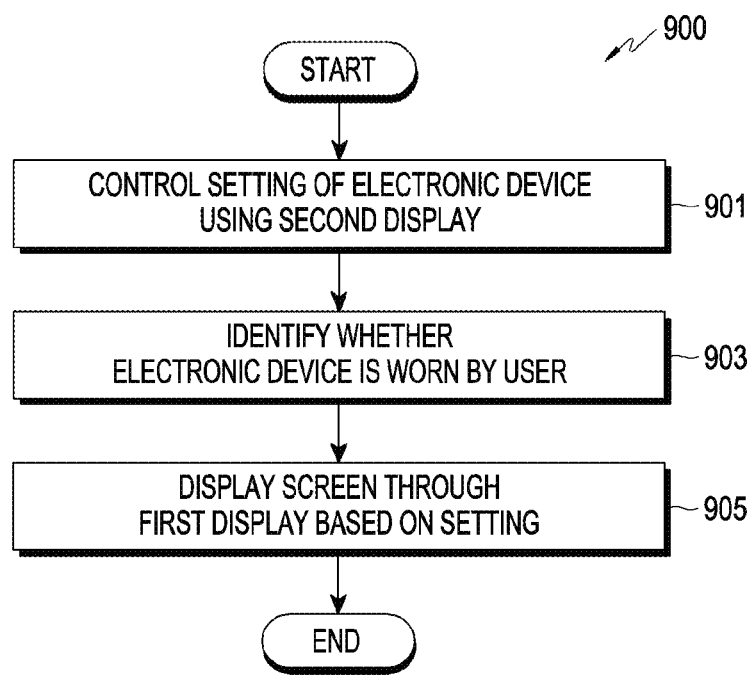
FIG. 9 is a flowchart illustrating an example method for controlling settings of an electronic device using a second display according to various embodiments.

FIG. 9 is a flowchart 900 illustrating an example method for controlling settings of an electronic device 101 using a second display 230 according to various embodiments.

Figure 10:
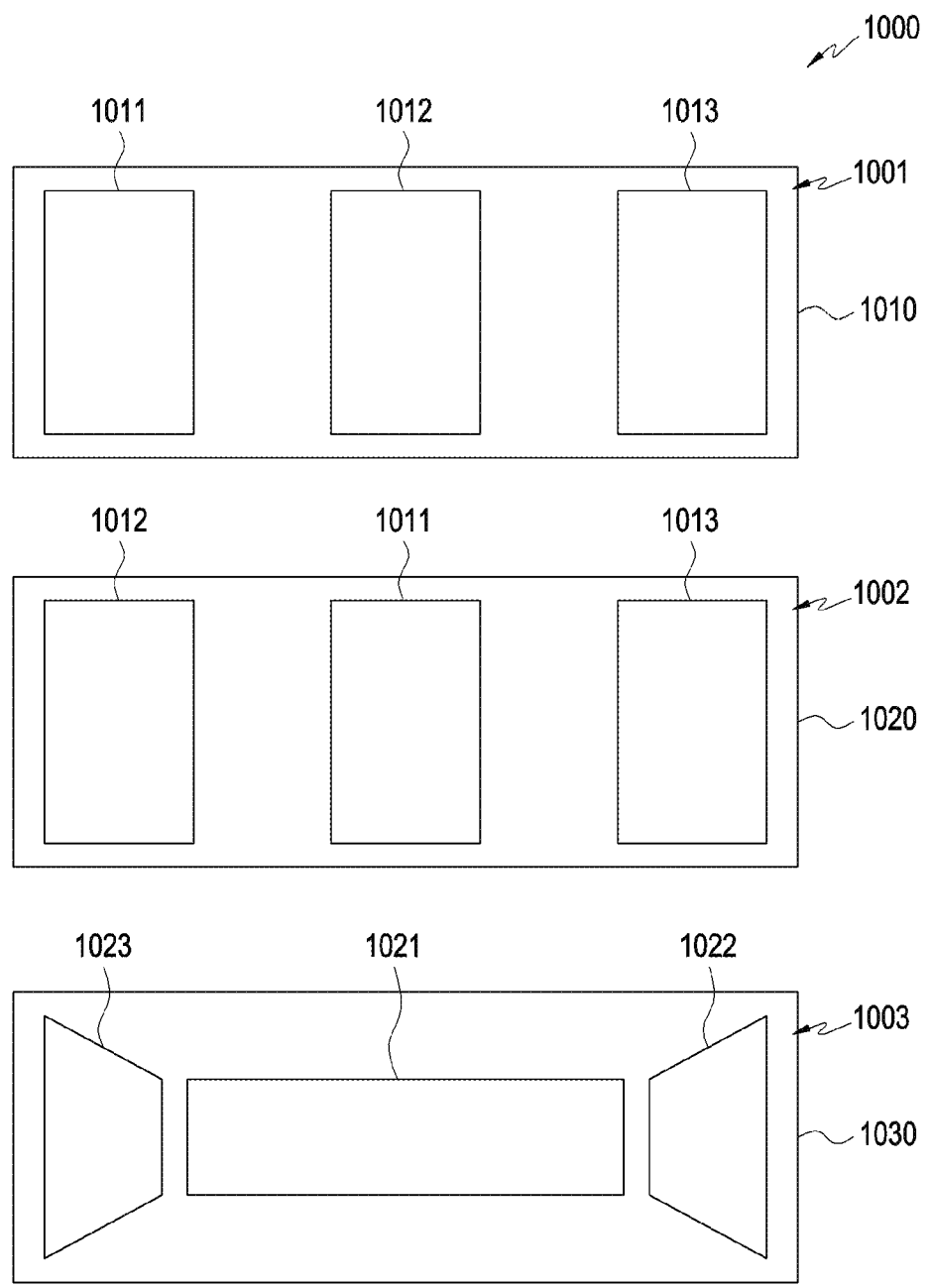
FIG. 10 is a diagram illustrating an example method for controlling settings of an electronic device using a second display according to various embodiments.

FIG. 10 is a diagram 1000 illustrating an example method for controlling settings of an electronic device 101 using a second display 230 according to various embodiments.

Referring to FIGS. 9 and 10, in operation 901, in an embodiment, the processor 120 may control the setting of the electronic device 101 using the second display 230.

In an embodiment, the processor 120 may control a setting (e.g., a setting-related parameter) of the electronic device 101, based on a user input to the screen displayed through the second display 230. For example, the processor 120 may change (or manipulate) the setting for a home screen, an application, a display, sound and vibration, and/or a lock screen, based on a user input to the screen displayed through the second display 230. However, the setting that may be changed (or manipulated) based on a user input to the screen displayed through the second display 230 is not limited to the above-described examples.

In an embodiment, the processor 120 may control the settings of a plurality of pages included in the home screen and/or application icons included in each of the plurality of pages, based on a user input to the screen displayed through the second display 230. For example, in reference numeral 1001 of FIG. 10, the processor 120 may display a screen 1010 including a plurality of pages 1011, 1012, and 1013 of the home screen through the second display 230. The processor 120 may change the array (or arrangement) order of the plurality of pages 1011, 1012, and 1013 of the home screen of the screen 1010, based on a user input to the screen 1010, as illustrated in the screen 1020 of reference numeral 1002 of FIG. 10. For example, as illustrated in reference numerals 1001 and 1002, the processor 120 may change the array order of the page 1011 and the page 1012 based on a user input to the screen 1010.

Although not illustrated in FIG. 10, the processor 120 may change the order in which the one or more application icons are arranged and/or the size of the one or more application icons, based on a user input to the one or more application icons included in the plurality of pages 1011, 1012, and 1013.

In an embodiment, when the setting of the electronic device 101 is changed based on a user input to the screen displayed through the second display 230, the processor 120 may display the screen to which the changed setting is applied through the first display 221.

In operation 903, in an embodiment, after controlling the setting of the electronic device 101 using the second display 230, the processor 120 may identify whether the electronic device 101 is worn by the user.

In operation 905, in an embodiment, based on identifying that the electronic device 101 is worn by the user, the processor 120 may display a screen through the first display 221 based on the setting controlled in operation 901.

In an embodiment, the processor 120 may identify that the electronic device 101 is worn by the user while displaying the screen to which the setting controlled based on the user input is applied through the second display 230. Based on identifying that the electronic device 101 is worn by the user, the processor 120 may display a screen corresponding to the screen displayed through the second display 230 and to which the controlled setting is applied, through the first display 221. For example, based on identifying that the electronic device 101 is worn by the user while the screen 1020 including the plurality of pages 1011, 1012, and 1013 is displayed through the second display 230, the processor 120 may display, through the first display 221, the screen 1030 including the plurality of pages 1021, 1022, and 1023 arranged in an array order corresponding to the array order of the plurality of pages 1011, 1012, and 1013 included in the screen 1020, as illustrated in reference numeral 1003 of FIG. 10.

In an embodiment, the plurality of pages 1021, 2022, and 1023 may be pages arranged in a virtual space (or 3D space) in the array order corresponding to the array order of the plurality of pages 1011, 1012, and 1013 included in the screen 1020. For example, the page 1023, the page 1021, and the page 1022 displayed from the left on the first display 221 when the electronic device 101 is worn by the user in reference numeral 1003 may correspond to the page 1013, the page 1011, and the page 1012, respectively, displayed from the right on the second display 230 when the electronic device 101 is not worn by the user in reference numeral 1002.

In FIGS. 9 and 10, it is illustrated that when the setting of the electronic device 101 is controlled based on a user input to the screen displayed through the second display 230, the screen to which the controlled setting is applied is displayed through the second display 230, but the disclosure is not limited thereto. For example, the processor 120 may change only the setting for the screen to be displayed through the first display 221 without changing the setting for the screen displayed through the second display 230, based on a user input to the screen displayed through the second display 230.

In FIGS. 9 and 10, it is illustrated that the setting of the electronic device 101 is controlled based on a user input on the screen displayed through the second display 230, but the disclosure is not limited thereto. For example, the processor 120 may change the setting for an application (or content) to be displayed through the first display 221 based on a user input while the screen is displayed through the first display 221.

Figure 11:
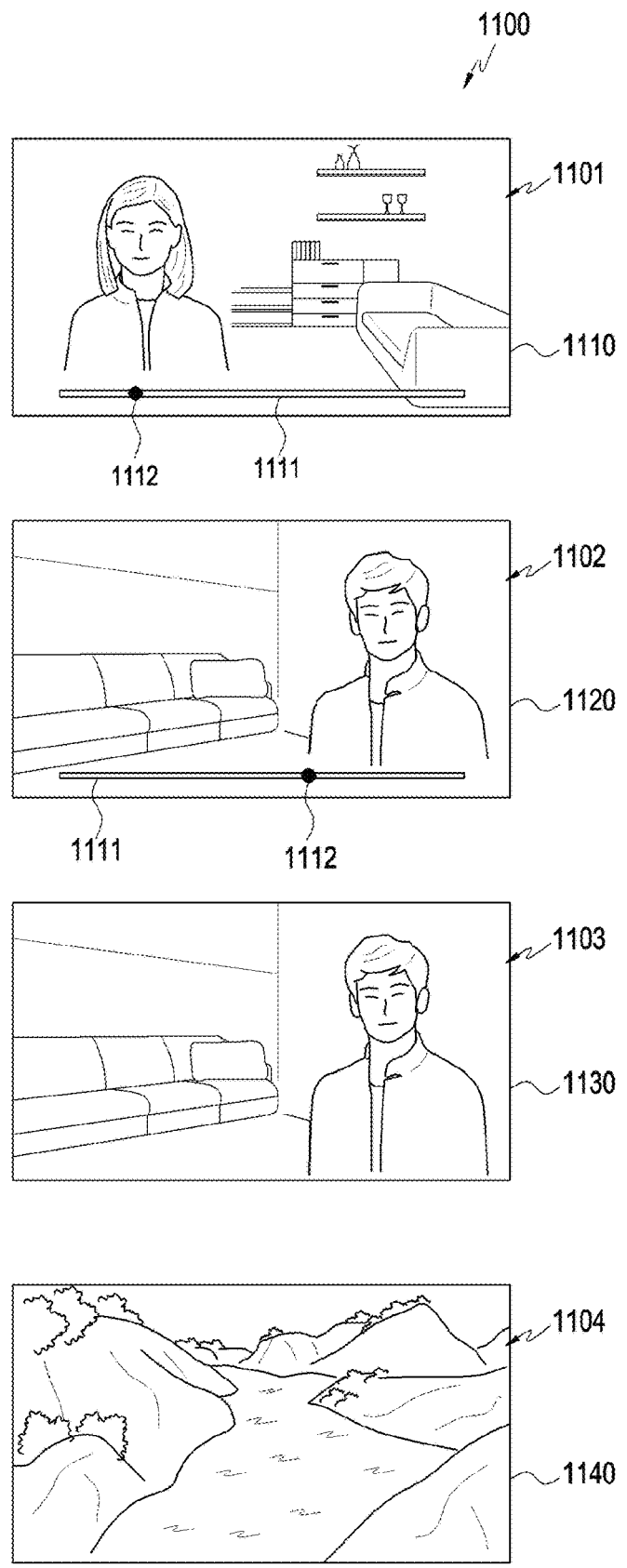
FIG. 11 is a diagram illustrating an example method for providing an image through a first display and a second display according to various embodiments.

FIG. 11 is a diagram 1100 illustrating an example method for providing an image through a first display 221 and a second display 230 according to various embodiments.

Referring to FIG. 11, in an embodiment, the processor 120 may display an image through the second display 230. For example, as illustrated in reference numeral 1101, the processor 120 may display a screen 1110 of an image through the second display 230.

In an embodiment, the processor 120 may adjust the playback time point (or display time point) of the image, based on a user input to a movable object 1112 on a progress bar 1111 included in the interface for adjusting the playback time point of the image. For example, as illustrated in reference numeral 1102, the processor 120 may move the object 1112 based on a user input to the object 1112, thereby displaying the screen 1120 at the time point corresponding to the position of the object 1112 through the second display 230.

In an embodiment, while displaying the image through the second display 230, the processor 120 may pause the playback of the image based on a user input. Based on identifying that the electronic device 101 is worn by the user after the playback of the image is paused, the processor 120 may play back the image through the first display 221 from the time point when the image is paused. For example, based on identifying that the electronic device 101 is worn by the user after the playback of the image is paused, the processor 120 may play back the image from the same screen 1130 as the screen 1120 at the paused time point in the image through the first display 221, as illustrated in reference numeral 1103.

In an embodiment, based on identifying that the electronic device 101 is worn by the user while displaying the image through the second display 230, the processor 120 may play back the image through the first display 221 from a time point a designated time before the time when the electronic device 101 is worn by the user in the image.

In an embodiment, based on identifying that the electronic device 101 is worn by the user while displaying the image through the second display 230, the processor 120 may play back the image from the start time point (e.g., the first frame of the image) of the image through the first display 221. For example, based on identifying that the electronic device 101 is worn by the user while displaying the image through the second display 230, the processor 120 may display, through the first display 221, the image played back from the start point of the image in the virtual space (e.g., to provide the user with a sense of space, as if an avatar (or character) corresponding to the user views the image in the virtual space representing a theater).

Although not illustrated in FIG. 11, in an embodiment, the processor 120 may display virtual reality (VR) content (e.g., a 360-degree image) through the first display 221. For example, as illustrated in reference numeral 1104, the processor 120 may display, through the first display 221, a screen 1140 for one scene of the virtual space of VR content, which is rendered differently according to the user's gaze (or the direction in which the electronic device 101 faces).

Figure 12:
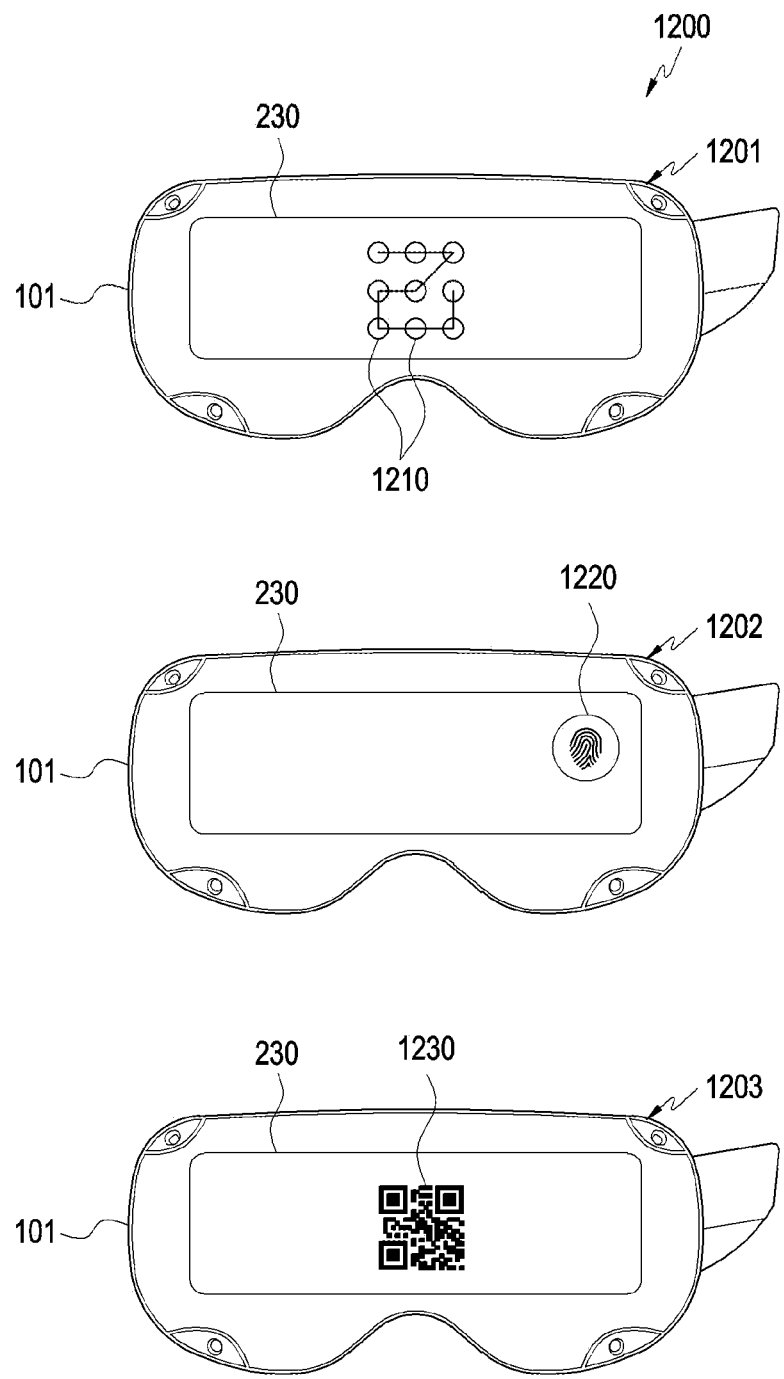
FIG. 12 is a diagram illustrating an example method for performing authentication using a second display according to various embodiments.

FIG. 12 is a diagram 1200 illustrating an example method for performing authentication using a second display 230 according to various embodiments.

Referring to FIG. 12, in an embodiment, the processor 120 may perform authentication using the second display 230.

In an embodiment, after the second display 230 is activated, as illustrated in reference numeral 1201, the processor 120 may display an interface 1210 for pattern input (e.g., guiding to a pattern input) through the second display 230. The processor 120 may receive a user input of inputting a pattern for unlocking on the second display 230. When the received pattern matches a preset (e.g., specified) pattern (or a pre-registered pattern), the processor 120 may unlock the electronic device 101.

In an embodiment, after the second display 230 is activated, as illustrated in reference numeral 1202, the processor 120 may display an image 1220 indicating an area for fingerprint input through the second display 230. The processor 120 may detect (or recognize) the user's fingerprint through a fingerprint sensor (e.g., an optical or ultrasonic fingerprint sensor disposed under the second display 230). When the detected fingerprint matches the pre-registered fingerprint, the processor 120 may unlock the electronic device 101.

Reference numeral 1201 and reference numeral 1202 illustrate a pattern and a fingerprint as inputs for unlocking the electronic device 101, but are not limited thereto. For example, the processor 120 may unlock the electronic device 101 based on a user input of inputting a password through the second display 230.

Reference numerals 1201 and 1202 illustrate that the electronic device 101 is unlocked by authentication, but the disclosure is not limited thereto. For example, the processor 120 may perform a financial transaction or a payment for purchase by performing authentication using the second display 230. For example, as illustrated in reference numeral 1203, the processor 120 may display a QR code (or a barcode) 1230 through the second display 230. The user may perform payment-related authentication using the QR code 1230 displayed through the second display 230 (e.g., by capturing the QR code 1230 by the camera of another external electronic device).

Figure 13:
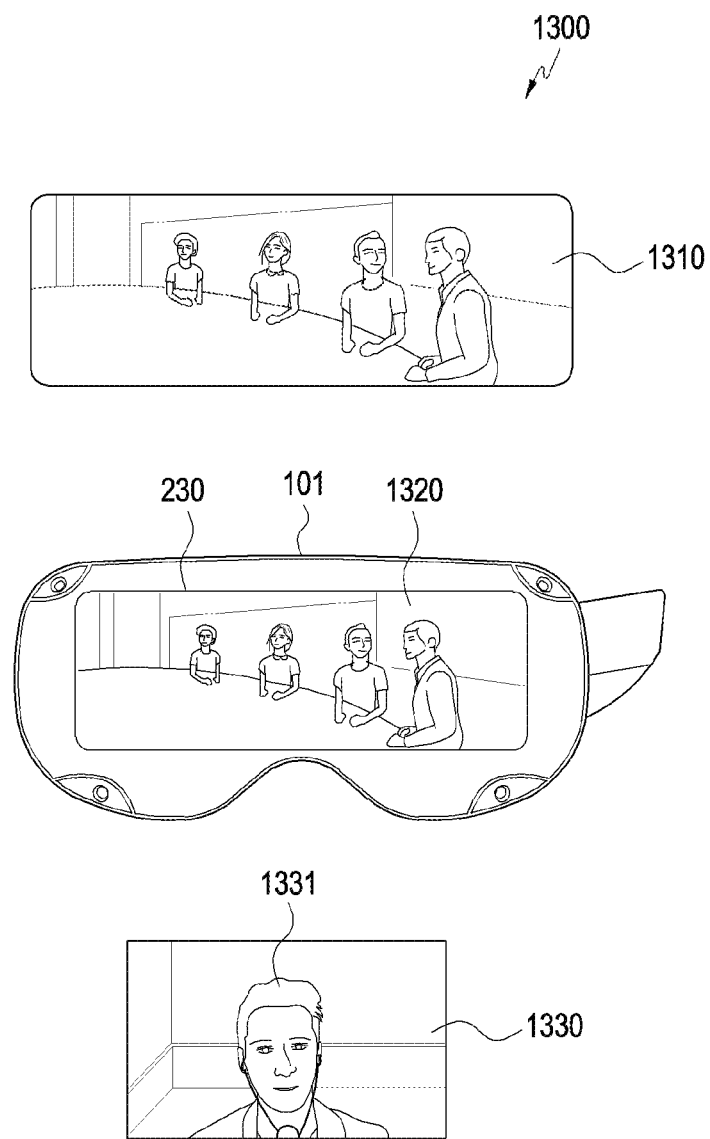
FIG. 13 a diagram illustrating an example method for performing a video conference using a first display and a second display according to various embodiments.

FIG. 13 is a diagram 1300 illustrating an example method for performing a video conference using a first display 221 and a second display 230 according to various embodiments.

Referring to FIG. 13, in an embodiment, the processor 120 may perform a video conference using the first display 221 and the second display 230.

In an embodiment, the processor 120 may perform a virtual conference while the electronic device 101 is worn by the user. For example, the processor 120 may display an image 1310 including the counterpart of the virtual conference through the first display 221 while the virtual conference is performed with the electronic device 101 worn by the user. For example, the processor 120 may display, through the first display 221, a virtual reality image in which an avatar (or character) corresponding to the user attends the virtual conference at a first-person viewpoint (e.g., the viewpoint of the avatar) while the electronic device 101 performs the virtual conference while being worn by the user.

In an embodiment, when the electronic device 101 for the user is unworn during the virtual conference, the processor 120 may display an image 1320 including the counterpart of the virtual conference through the second display 230 so that the virtual conference continues using the screen displayed through the second display 230. For example, when the electronic device 101 for the user is unworn during the virtual conference, the processor 120 may display the virtual conference image through the second display 230 at a first-person viewpoint or a third-person viewpoint of the avatar corresponding to the user, through the second display 230.

In an embodiment, while displaying the image 1320 through the second display 230, the processor 120 may transmit the image 1330 including the user 1331 obtained through the camera module (e.g., the VST camera modules 211 and 212) to the electronic device of the counterpart of the virtual conference through the communication module. The electronic device of the counterpart of the virtual conference may output the received image 1330 including the user 1331.

Figure 14:
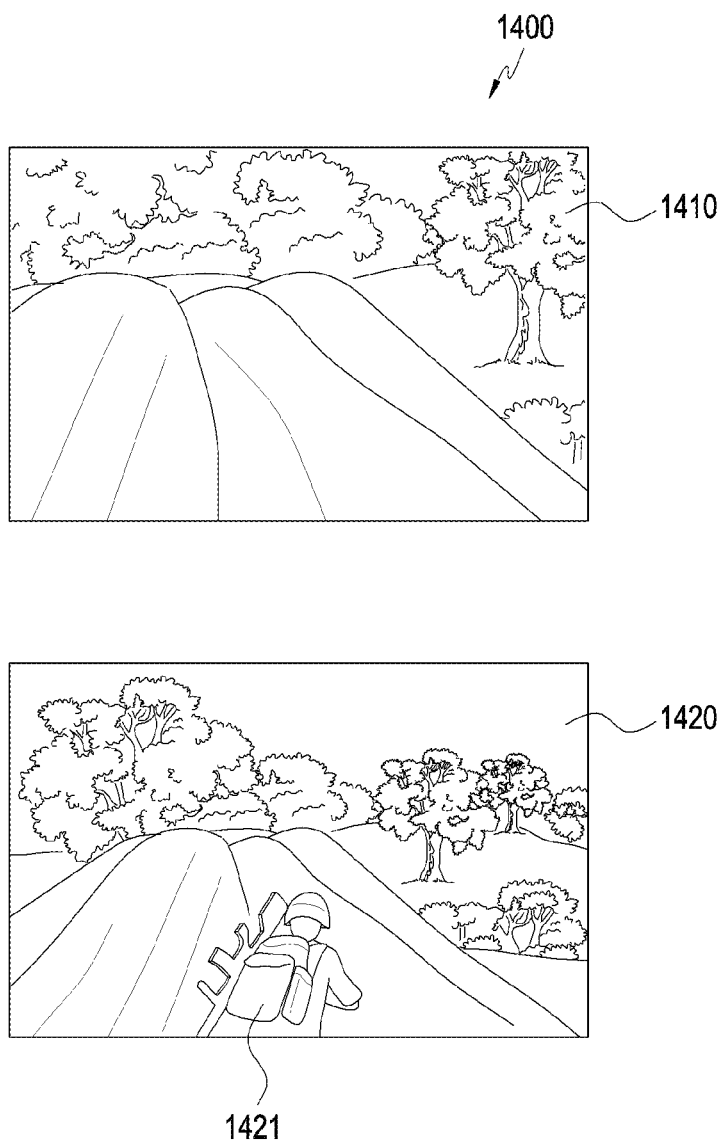
FIG. 14 is a diagram illustrating an example method for providing content through a first display and a second display according to various embodiments.

FIG. 14 is a diagram illustrating 1400 illustrating an example method for providing content through a first display 221 and a second display 230 according to various embodiments.

In an embodiment, the processor 120 may display content using the first display 221 and/or the second display 230.

In an embodiment, the processor 120 may execute a game (e.g., VR game) application through the first display 221 while the electronic device 101 is worn by the user. For example, the processor 120 may display a game screen 1410 running in the first-person mode through the first display 221 while the electronic device 101 is worn by the user.

In an embodiment, when the electronic device 101 is for the user is unworn while the game is played in the first-person mode, the processor 120 may display a game screen 1420 (e.g., the game screen 1420 including the user's character 1421) played in the third-person mode through the second display 230 so that the game continues using the screen displayed through the second display 230.

FIG. 14 illustrates that the electronic device 101 plays a game in the first-person mode while being worn by the user, and the electronic device 101 plays a game in the third-person mode while not being worn by the user, but the disclosure is not limited thereto. For example, the processor 120 may set a viewpoint (e.g., a first-person viewpoint and a third person viewpoint) of a game to be played through the second display 230 and/or the first display 221, based on a user input to the screen related to the game setting displayed on the second display 230 (or the first display 221).

Figure 15:
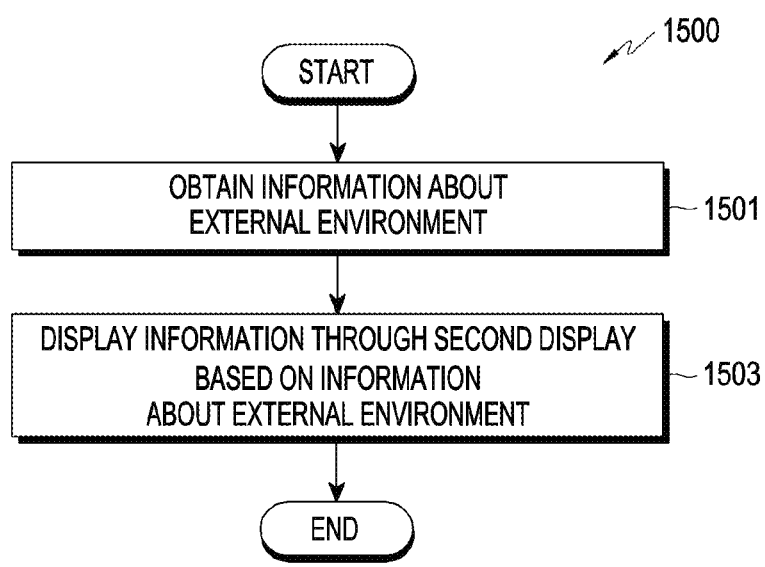
FIG. 15 is a flowchart illustrating an example method for displaying information through a second display based on information about an external environment according to various embodiments.

FIG. 15 is a flowchart 1500 illustrating an example method for displaying information through a second display 230 based on information about an external environment according to various embodiments.

Figure 16:
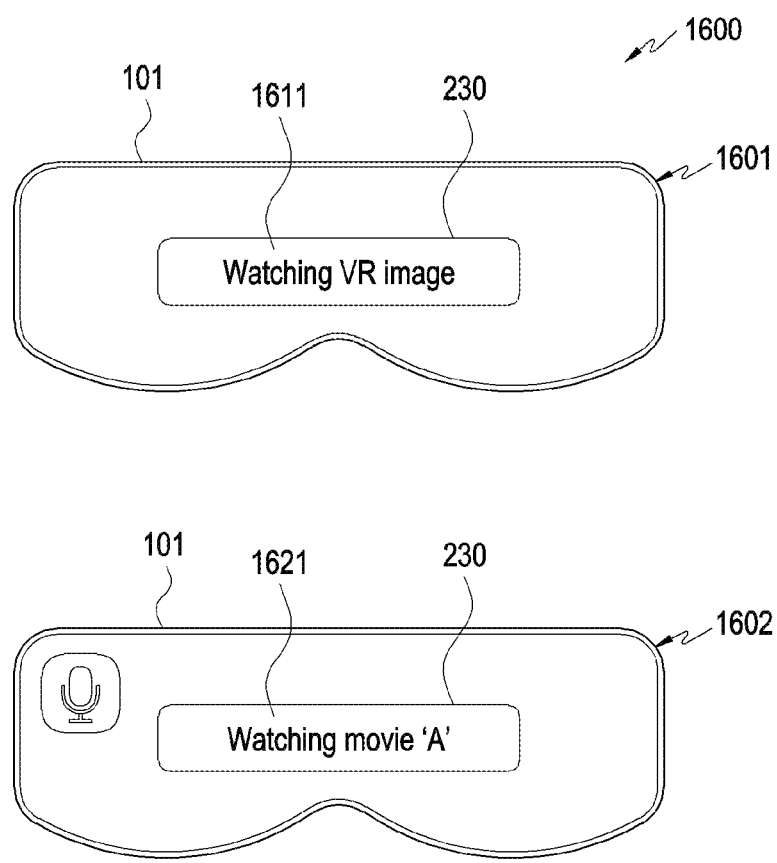
FIG. 16 is a diagram illustrating an example method for displaying information through a second display based on information about an external environment according to various embodiments.

FIG. 16 is a diagram 1600 illustrating an example method for displaying information through a second display 230 based on information about an external environment according to various embodiments.

Referring to FIGS. 15 and 16, in operation 1501, in an embodiment, the processor 120 may obtain information about the external environment of the electronic device 101 through a camera module (e.g., the VST camera modules 211 and 212, the plurality of camera modules 213, 214, 215, and 216), a sensor, and/or an input device (e.g., a microphone) while the electronic device 101 is worn by the user.

In an embodiment, the information about the external environment may include information about a person positioned around the electronic device 101 and/or context information about the electronic device 101. However, the information about the external environment is not limited to the above-described example.

In an embodiment, the processor 120 may obtain information about whether a person is positioned around the electronic device 101 and/or information about a person positioned around the electronic device 101, based on an image obtained through the camera module.

In an embodiment, the processor 120 may obtain, through a sensor (e.g., a GPS sensor) and/or an input device (e.g., a microphone), information about whether the user of the electronic device 101 is positioned indoors and/or whether the user is moving through a means of transportation.

In operation 1503, in an embodiment, the processor 120 may display information about the second display 230, based on the information about the external environment.

In an embodiment, the processor 120 may differently determine information to be displayed through the second display 230 according to the information about the external environment. For example, while the VR image is provided through the first display 221 while the electronic device 101 is worn by the user, the processor 120 may identify a security level designated to the person positioned around the electronic device 101. The processor 120 may differently display information about content displayed through the first display 221 through the second display 230 according to the security level designated to the person positioned around the electronic device 101. For example, the processor 120 may display information about the content displayed through the first display 221 in more detail through the second display 230 as the security level designated to the person positioned around the electronic device 101 decreases.

In an embodiment, when the security level designated to the person positioned nearby is higher than a designated level, the processor 120 may display information 1611 indicating that the user is watching the VR image through the second display 230, as illustrated in reference numeral 1601 of FIG. 16. When the security level designated to the person positioned nearby is less than or equal to the designated level, the processor 120 may display information 1621 including more detailed content for the VR image being viewed by the user through the second display 230, as illustrated in reference numeral 1602 of FIG. 16.

Although not illustrated in FIG. 16, in an embodiment, when it is identified that the user of the electronic device 101 is moving through the means of transportation while the VR image is provided through the first display 221, the processor 120 may display information 1611 indicating that the user is watching the VR image through the second display 230, as illustrated in reference numeral 1601 of FIG. 16. When it is identified that the user of the electronic device 101 is positioned indoors while the VR image is provided through the first display 221, the processor 120 may display information 1612 indicating that the user is watching the VR image through the second display 230, as illustrated in reference numeral 1602 of FIG. 16. For example, while the VR image is provided through the first display 221, the processor 120 may differently display information displayed through the second display 230 according to the position of the user of the electronic device 101.

Figure 17:
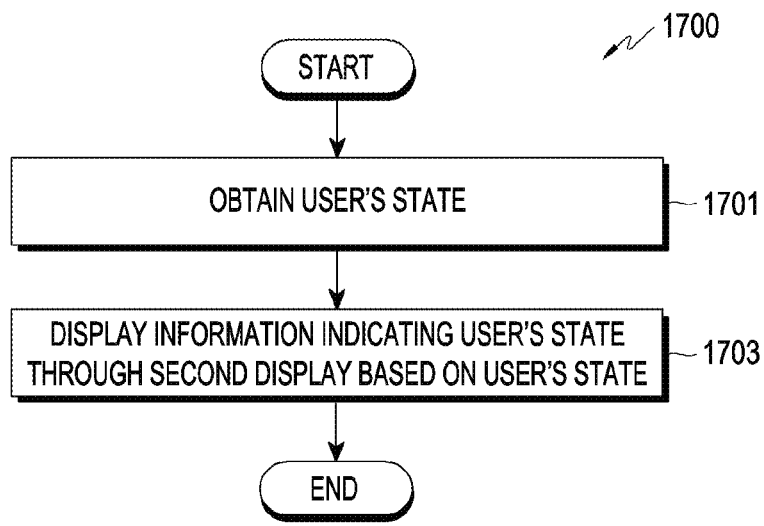
FIG. 17 is a flowchart illustrating an example method for displaying information through a second display based on a user's state according to various embodiments.

FIG. 17 is a flowchart 1700 illustrating an example method for displaying information through a second display 230 based on a user's state according to various embodiments.

Figure 18:
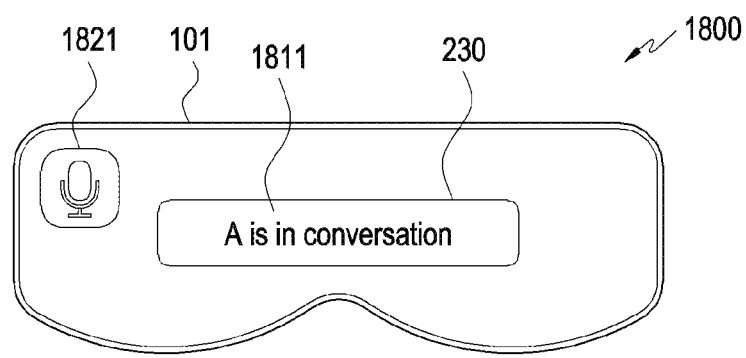
FIG. 18 is a diagram illustrating an example method for displaying information through a second display based on a user's state according to various embodiments.

FIG. 18 is a diagram 1800 illustrating an example method for displaying information through a second display 230 based on a user's state according to various embodiments.

Referring to FIGS. 17 and 18, in operation 1701, in an embodiment, the processor 120 may obtain the state of the user.

In an embodiment, the processor 120 may obtain the state of the user wearing the electronic device 101 through a camera module (e.g., the VST camera modules 211 and 212) and/or an input device (e.g., a microphone). For example, the processor 120 may identify that the counterpart is positioned around the electronic device 101, based on the image obtained through the camera module. The processor 120 may obtain the user's voice and/or the counterpart's voice through the microphone. The processor 120 may identify that the user is conversing with the counterpart, based on identifying that the counterpart is positioned around the electronic device 101 and the voice of the user and/or the voice of the counterpart is obtained.

In operation 1703, in an embodiment, the processor 120 may display information indicating the state of the user through the second display 230, based on the state of the user. For example, based on identifying that the user is conversing with the counterpart, as illustrated in FIG. 18, the processor 120 may display, through the second display 230, information 1811 indicating that the user (e.g., "A") is in conversation with the counterpart, together with an icon 1821 indicating that a sound is obtained through the microphone.

FIGS. 17 and 18 illustrate a state in which the user is conversing with the counterpart as the state of the user, but the disclosure is not limited thereto. For example, the processor 120 may display, through the second display 230, information about the emotional state of the user wearing the electronic device 101 and/or whether the user wearing the electronic device 101 is in a state of being capable of conversation.

Figure 19:
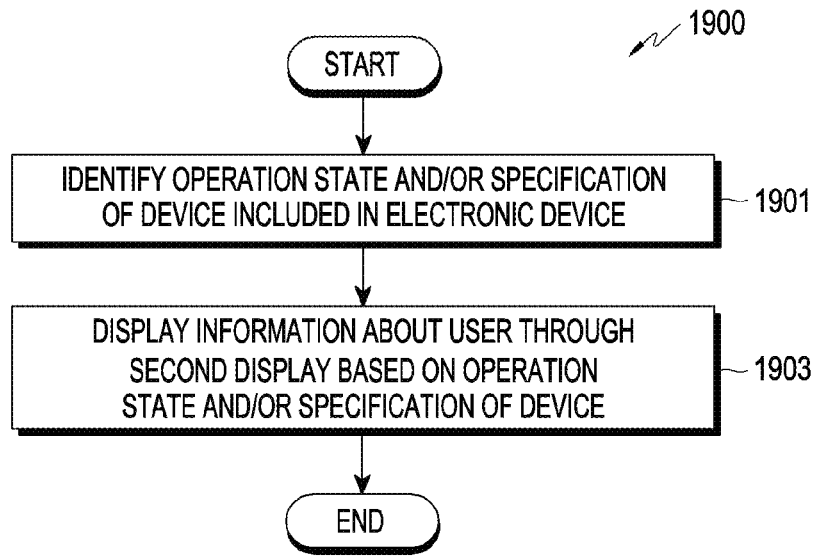
FIG. 19 is a flowchart illustrating an example method for displaying information about a user through a second display based on an operation state and/or specification of a device included in an electronic device according to various embodiments.

FIG. 19 is a flowchart 1900 illustrating an example method for displaying information about a user through a second display 230 based on an operation state and/or specification of a device included in an electronic device 101 according to various embodiments.

Referring to FIG. 19, in operation 1901, in an embodiment, the processor 120 may identify the operation state and/or the specification of a device included in the electronic device 101. For example, as the operation state of the device included in the electronic device 101, the processor 120 may identify the on/off state of each of the plurality of camera modules, the field of view of each of the plurality of camera modules, the direction in which the microphone obtains sound, and/or the magnitude of the sound obtained by the microphone. For example, as the specification of the device included in the electronic device 101, the processor 120 may identify the resolution of the image that may be obtained by each of the plurality of camera modules and/or the performance of the microphone. However, the operation state and/or specification of the device included in the electronic device 101 is not limited to the above-described example.

In operation 1903, in an embodiment, the processor 120 may display information about the user through the second display 230, based on the operation state and/or specification of the device.

In an embodiment, in a state in which the electronic device 101 is worn by the user, the processor 120 may differently display the direction and/or the size of the image with respect to the user's ears through the second display 230, based on the direction in which the microphone obtains the sound and/or the magnitude of the sound obtained by the microphone.

In an embodiment, in a state in which the electronic device 101 is worn by the user, the processor 120 may differently display the direction and/or size of the image with respect to the user's eyes through the second display 230, based on the view angle of the activated camera module. For example, the processor 120 may display the user's eyes larger through the second display 230 as the entire view angle area of the plurality of activated camera modules is wider. For example, the processor 120 may display, through the second display 230, the user's eyes (e.g., the user's eyeballs) facing in the direction corresponding to the direction in which the center of the entire view angle area of the activated plurality of camera modules faces.

Figure 20:
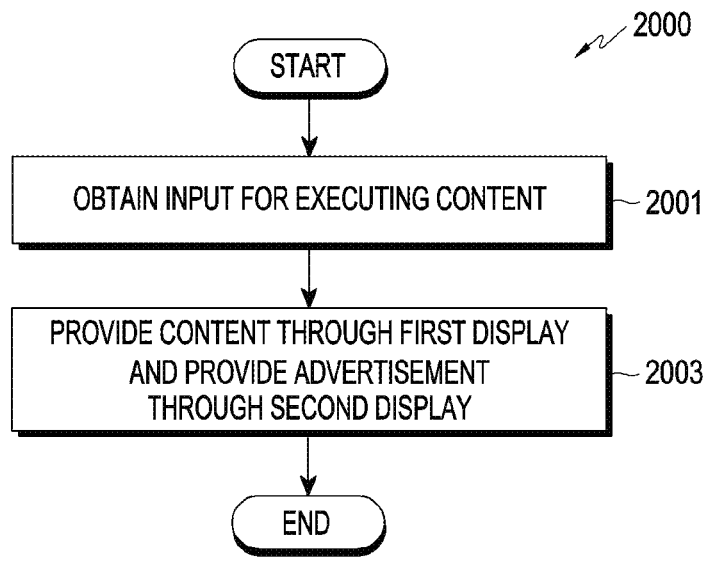
FIG. 20 is a flowchart illustrating an example method for providing content and an advertisement according to various embodiments.

FIG. 20 is a flowchart 2000 illustrating an example method for providing content and an advertisement according to various embodiments.

Referring to FIG. 20, in operation 2001, in an embodiment, the processor 120 may obtain an input for executing content. For example, the processor 120 may obtain an input for executing content (e.g., an image) through the first display 221 or the second display 230.

In operation 2003, in an embodiment, the processor 120 may provide content through the first display 221 and may provide an advertisement (e.g., advertisement content) through the second display 230.

In an embodiment, the processor 120 may execute the execution screen of the content through the first display 221 while the electronic device 101 is worn by the user. The processor 120 may receive an advertisement from an external electronic device in real time through the communication module 190 while the electronic device 101 is worn by the user. The processor 120 may display the received advertisement through the second display 230. For example, the processor 120 may display the execution screen of the content through the first display 221 and may display the advertisement through the second display 230 while the electronic device 101 is worn by the user.

In an embodiment, the electronic device 101 may be configured to output advertisements at a plurality of time points (e.g., multiple times) while content (e.g., an image) is executed. In this case, the processor 120 may control to display the advertisement through the second display 230 and execute the content continuously (e.g., seamlessly) executed through the first display 221 at each of the time points set to output the advertisement.

A method for controlling a plurality of displays in a wearable device according to an example embodiment may comprise: identifying whether the wearable device is worn on a face of a user through a sensor of the wearable device including a first display, a second display, the sensor, and a camera configured to capture images corresponding to a field of view of the user wearing the wearable device, wherein the first display is disposed to face in a first direction toward the user when the wearable device is worn on the face of the user, and the second display is disposed to face in a second direction opposite to the first direction; based on identifying that the wearable device is worn on the face, activating the first display; based on identifying that the wearable device is not worn on the face, deactivating the first display; while the wearable device is not worn on the face, controlling the second display to display a first screen and controlling the camera to capture images of the face of the user looking toward the first screen; while the first screen is displayed through the second display, identifying that the wearable device is worn on the face; and based on identifying that the wearable device is worn on the face while displaying the first screen through the second display, controlling the first display to display a second screen related to the first screen.

In an example embodiment, controlling the first display to display the second screen may include: obtaining a user input related to the first screen displayed through the second display, and based on the user input, performing an operation of displaying the second screen.

In an example embodiment, controlling the first display to display the second screen may include: performing an operation of displaying the second screen such that the second screen has continuity to the first screen.

In an example embodiment, controlling the first display to display the second screen may include: performing an operation of displaying the second screen such that content provided in the second screen is displayed in a virtual space.

In an example embodiment, the method may further comprise obtaining, using the camera, an image for the user in a state in which the wearable device is not worn on the face; and transmitting, to an external electronic device, the image.

In an example embodiment, the method may further comprise: based on the wearable device being changed from a sleep state to a standby state, or based on the wearable device being turned on, activating the second display.

In an example embodiment, the method may further comprise: while displaying the second screen through the first display, displaying, through the second display, information related to content provided in the second screen.

In an example embodiment, the method may further comprise: while a screen is provided through the first display in a state in which the wearable device is worn on the face, obtaining information about an environment of the wearable device, wherein the information about the environment of the wearable device includes whether a person is positioned around the wearable device; and based on the information about the environment, differently displaying information related to the screen through the second display.

In an example embodiment, the method may further comprise: obtaining a state of the user, while a screen is provided through the first display in a state in which the wearable device is worn on the face; and based on the state of the user, displaying information about whether the user is in a state of being capable of conversation through the second display.

In an example embodiment, the method may further comprise: while a screen is provided through the first display in a state in which the wearable device is worn on the face, displaying, through the second display, an image for an eye of the user.

The electronic device according to an embodiment may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood, by those skilled in the art, that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wearable device, comprising:
    a first display disposed to face a user when the wearable device is worn on a face of the user;
    a second display disposed to face in a direction opposite to a direction in which the first display faces;
    a camera configured to capture images in the direction opposite to the direction in which the first display faces;
    a sensor;
    at least one processor comprising processing circuitry; and
    memory storing instructions that, when executed by the at least one processor individually or collectively, cause the wearable device to:
        identify, through the sensor, whether the wearable device is worn on the face;
        based on identifying that the wearable device is worn on the face, activate the first display;
        based on identifying that the wearable device is not worn on the face, deactivate the first display;
        while the wearable device is not worn on the face,
            control the second display to display a first screen and control the camera to capture images of the face of the user looking toward the first screen displayed on the second display;
            while the first screen is displayed on the second display, identify, through the sensor, that the wearable device is worn on the face; and
            based on identifying that the wearable device is worn on the face while displaying the first screen through the second display, control the first display to display a second screen having continuity with the first screen.

2. The wearable device of claim 1, wherein the instructions, when executed by the at least one processor individually or collectively, cause the wearable device to:
    obtain a user input related to the first screen displayed through the second display; and
    based on the user input, control the first display to display the second screen.

3. The wearable device of claim 1, wherein the instructions, when executed by the at least one processor individually or collectively, cause the wearable device to control the first display to display the second screen such that content provided on the second screen is displayed in a virtual space.

4. The wearable device of claim 1, wherein the instructions, when executed by the at least one processor individually or collectively, further cause the wearable device to:
    obtain, using the camera, an image for the user in a state in which the wearable device is not worn on the face; and
    transmit, to an external electronic device, the image.

5. The wearable device of claim 1, wherein the instructions, when executed by the at least one processor individually or collectively, cause the wearable device to:
    based on the wearable device being changed from a sleep state to a standby state, or based on the wearable device being turned on, activate the second display.

6. The wearable device of claim 1, wherein the instructions, when executed by the at least one processor individually or collectively, cause the wearable device to:
while displaying the second screen on the first display, display, on the second display, information related to content provided on the second screen.

7. The wearable device of claim 1, wherein the instructions, when executed by the at least one processor individually or collectively, further cause the wearable device to:
while a screen is provided through the first display in a state in which the wearable device is worn on the face, obtain information about an environment of the wearable device, wherein the information about the environment of the wearable device includes whether a person is positioned around the wearable device; and
based on the information about the environment, differently display information related to the screen through the second display.

8. The wearable device of claim 1, wherein the instructions, when executed by the at least one processor individually or collectively, cause the wearable device to:
obtain a state of the user, while a screen is provided on the first display in a state in which the wearable device is worn on the face; and
based on the state of the user, display information about whether the user is available for of conversation on the second display.

9. The wearable device of claim 1, wherein the instructions, when executed by the at least one processor individually or collectively, cause the wearable device to:
while a screen is provided on the first display in a state in which the wearable device is worn on the face, display, on the second display, an image for an eye of the user.

10. A method for controlling a plurality of displays in a wearable device, the method comprising:
identifying whether the wearable device is worn on a face of a user through a sensor of the wearable device including a first display, a second display, the sensor, and a camera configured to capture images in a direction opposite to a direction in which the first display faces, wherein the first display is disposed to face toward the user when the wearable device is worn on the face of the user, and the second display is disposed to face in the direction opposite to the direction in which the first display faces;
based on identifying that the wearable device is worn on the face, activating the first display;
based on identifying that the wearable device is not worn on the face, deactivating the first display;
while the wearable device is not worn on the face, controlling the second display to display a first screen and controlling the camera to capture images of the face of the user looking toward the first screen displayed on the second display;
while the first screen is displayed on the second display, identifying, through the sensor, that the wearable device is worn on the face; and
based on identifying that the wearable device is worn on the face while displaying the first screen through the second display, controlling the first display to display a second screen having continuity with the first screen.

11. The method of claim 10, further comprising:
obtaining a user input related to the first screen displayed through the second display; and
controlling the first display to display the second screen, based on the user input.

12. The method of claim 10, further comprising controlling the first display to display the second screen such that content provided on the second screen is displayed in a virtual space.

13. The method of claim 10, further comprising:
obtaining, using the camera, an image for the user in a state in which the wearable device is not worn on the face; and
transmitting, to an external electronic device, the image.

14. The method of claim 10, further comprising:
based on the wearable device being changed from a sleep state to a standby state, or based on the wearable device being turned on, activating the second display.

15. The method of claim 10, further comprising:
while displaying the second screen on the first display, displaying, on the second display, information related to content provided on the second screen.

16. The method of claim 10, further comprising:
while a screen is provided through the first display in a state in which the wearable device is worn on the face, obtaining information about an environment of the wearable device,
wherein the information about the environment of the wearable device includes whether a person is positioned around the wearable device; and
based on the information about the environment, differently displaying information related to the screen through the second display.

17. The method of claim 10, further comprising:
obtaining a state of the user, while a screen is provided through the first display in a state in which the wearable device is worn on the face; and
based on the state of the user, displaying information about whether the user is available conversation on the second display.

18. The method of claim 10, further comprising:
while a screen is provided on the first display in a state in which the wearable device is worn on the face, displaying, on the second display, an image for an eye of the user.

* * * * *